(12) United States Patent
Naito et al.

(10) Patent No.: US 8,457,593 B2
(45) Date of Patent: Jun. 4, 2013

(54) INFORMATION PROCESSING DEVICE, COMMUNICATION SYSTEM, AND BILLING METHOD FOR WIRELESS TERMINAL DEVICE

(75) Inventors: Masahiko Naito, Tokyo (JP); Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/314,550

(22) Filed: Dec. 8, 2011

(65) Prior Publication Data
US 2012/0157040 A1  Jun. 21, 2012

(30) Foreign Application Priority Data
Dec. 21, 2010  (JP) ................... 2010-284781

(51) Int. Cl.
*H04M 11/00* (2006.01)
(52) U.S. Cl.
USPC .......... 455/406; 455/405; 455/432.1; 705/50; 709/227
(58) Field of Classification Search
USPC .......... 455/405, 410, 406, 436, 439; 370/235, 370/329, 330; 713/153; 705/40, 35, 50; 379/114.01, 114.15, 127.01; 709/217, 227
See application file for complete search history.

(56) References Cited

U.S. PATENT DOCUMENTS

| | | | |
|---|---|---|---|
| 6,859,650 B1* | 2/2005 | Ritter ........................... | 455/406 |
| 2005/0060334 A1* | 3/2005 | Kawamoto et al. ........... | 707/102 |
| 2006/0010500 A1* | 1/2006 | Elazar et al. .................. | 726/27 |
| 2006/0031515 A1* | 2/2006 | Van Gassel et al. .......... | 709/227 |
| 2006/0212400 A1* | 9/2006 | Kamperman et al. ......... | 705/51 |
| 2007/0079380 A1* | 4/2007 | Kawaguchi et al. .......... | 726/26 |
| 2008/0154780 A1* | 6/2008 | Soukup et al. ................ | 705/54 |
| 2008/0312968 A1* | 12/2008 | Hannon et al. .................. | 705/4 |
| 2010/0069039 A1 | 3/2010 | Kawamura et al. | |
| 2010/0093342 A1* | 4/2010 | Ramachandra Rao et al. ........................ | 455/432.1 |
| 2010/0174652 A1* | 7/2010 | Shear et al. .................... | 705/53 |
| 2011/0016045 A1* | 1/2011 | Smith et al. .................... | 705/40 |

FOREIGN PATENT DOCUMENTS

| | | |
|---|---|---|
| EP | 2 107 780 A1 | 10/2009 |
| JP | 2008-210301 | 9/2008 |
| WO | WO 2004/043008 A1 | 5/2004 |

OTHER PUBLICATIONS

The Extended European Search Report issued Mar. 22, 2012, in European Application No. / Patent No. 11191569.0-2413.

* cited by examiner

*Primary Examiner* — Mahendra Patel
(74) *Attorney, Agent, or Firm* — Oblon, Spivak, McClelland, Maier & Neustadt, L.L.P.

(57) ABSTRACT

An information processing device includes: a detecting unit configure to detect, with regard to a plurality of wireless terminal devices sharing a usage right of subscription authentication information relating to a mobile network operator which provides wireless connection services, transfer of the usage right among the wireless terminal devices; and a calculating unit configured to, in the event that transfer of the usage right is detected, calculate fees relating to the subscription authentication information occurring after the transfer, based on billing information set for the wireless terminal device to which the usage right has been transferred.

13 Claims, 24 Drawing Sheets

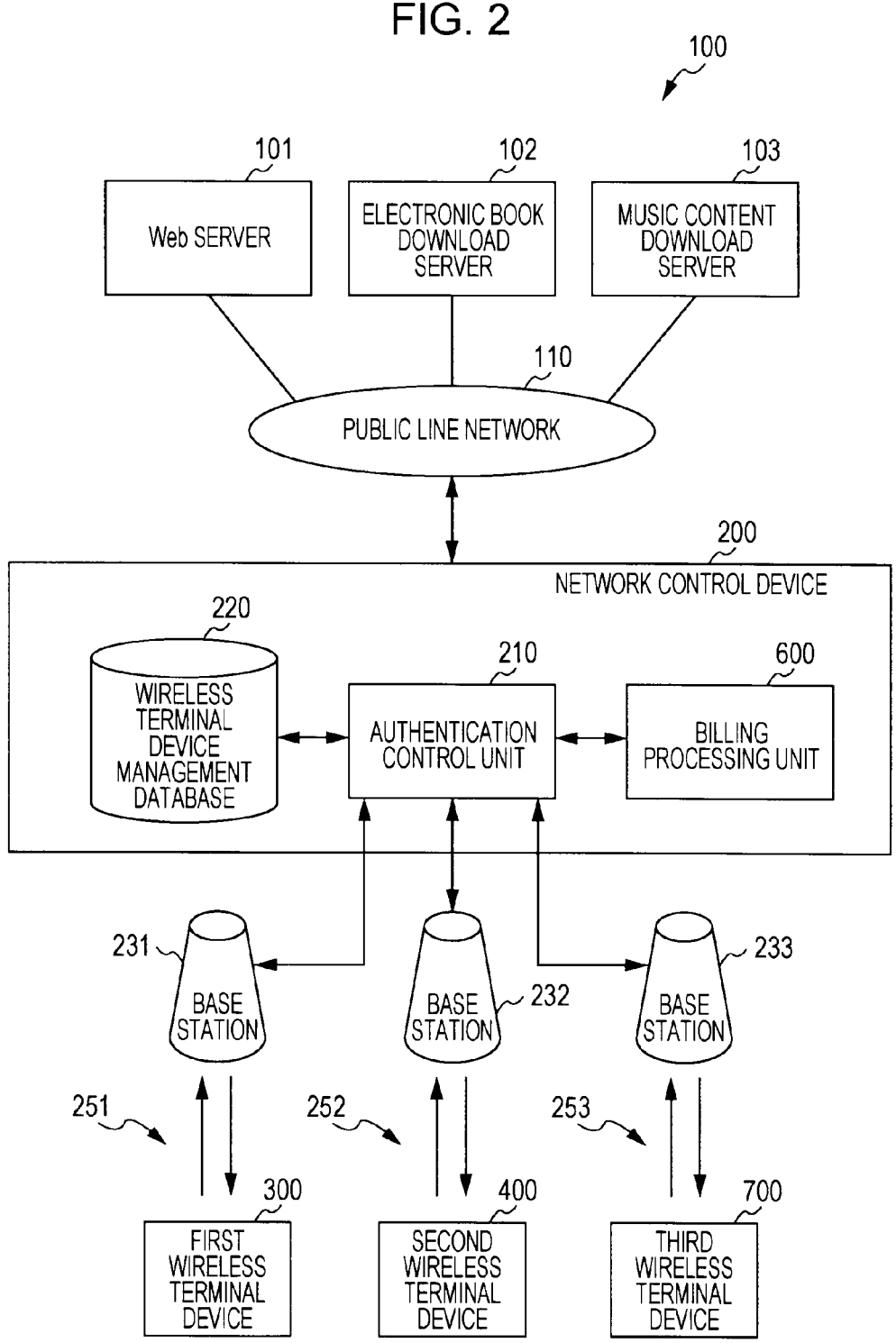

FIG. 4

| | TELEPHONE NUMBER 221 | E-MAIL ADDRESS 222 | TERMINAL IDENTIFICATION INFORMATION 223 | VALID/INVALID INFORMATION 224 |
|---|---|---|---|---|
| 1 | 600-111-XXXX | aaa@bbb.cc.jp | IME#1 | INVALID |
| 2 | 600-222-XXXX | ffff@bbb.cc.jp | IME#2 | VALID |
| 3 | 600-333-XXXX | gggg@ccc.dd.jp | IME#3 | INVALID |

220

225

FIG. 6
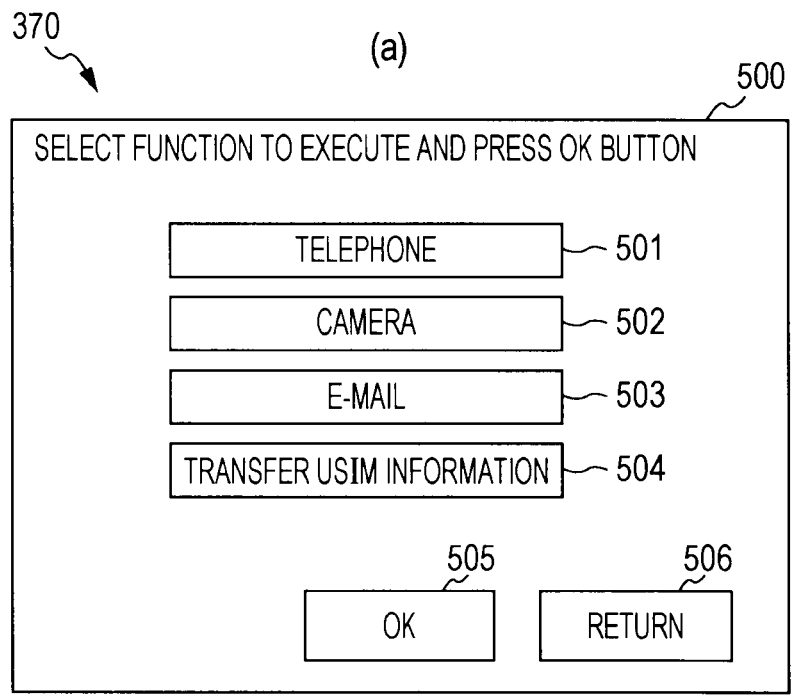
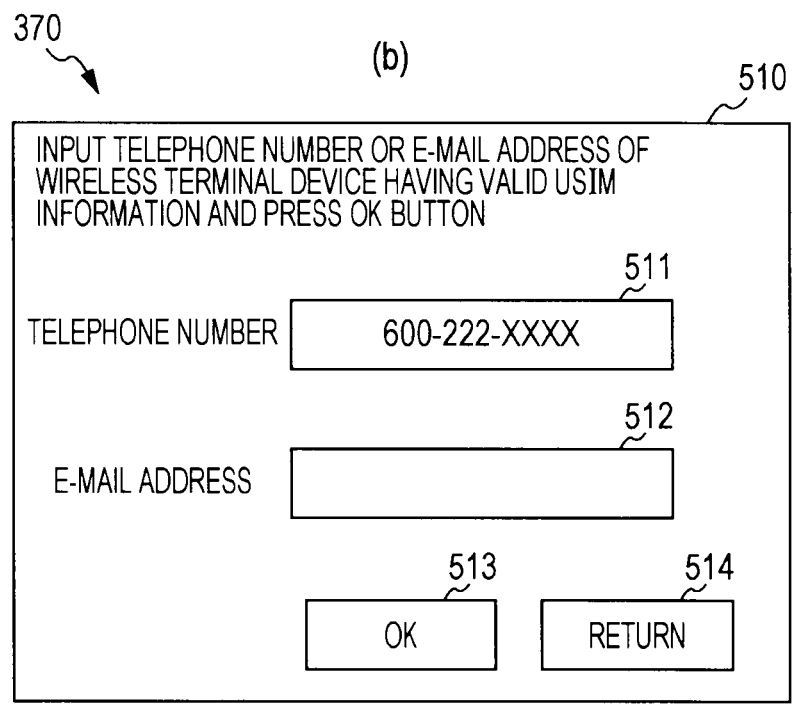

FIG. 7
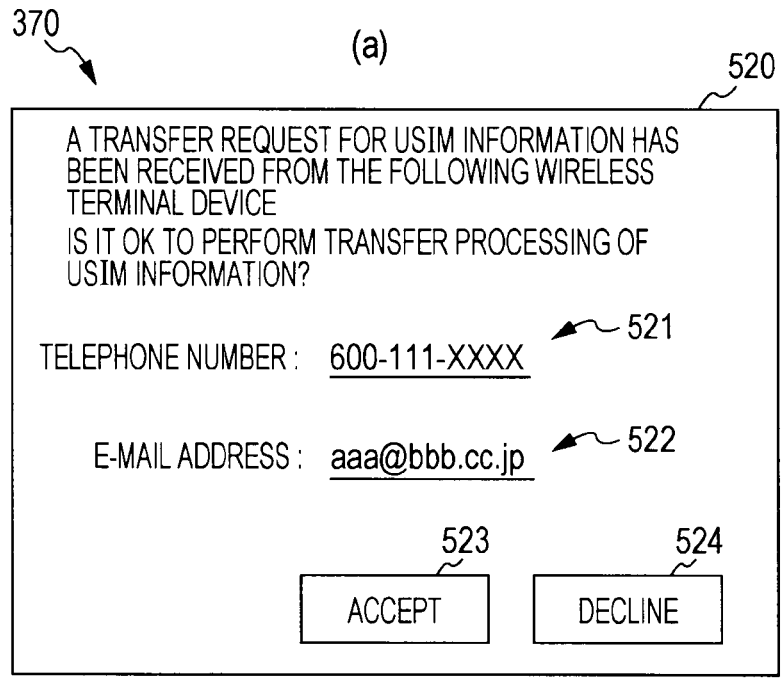
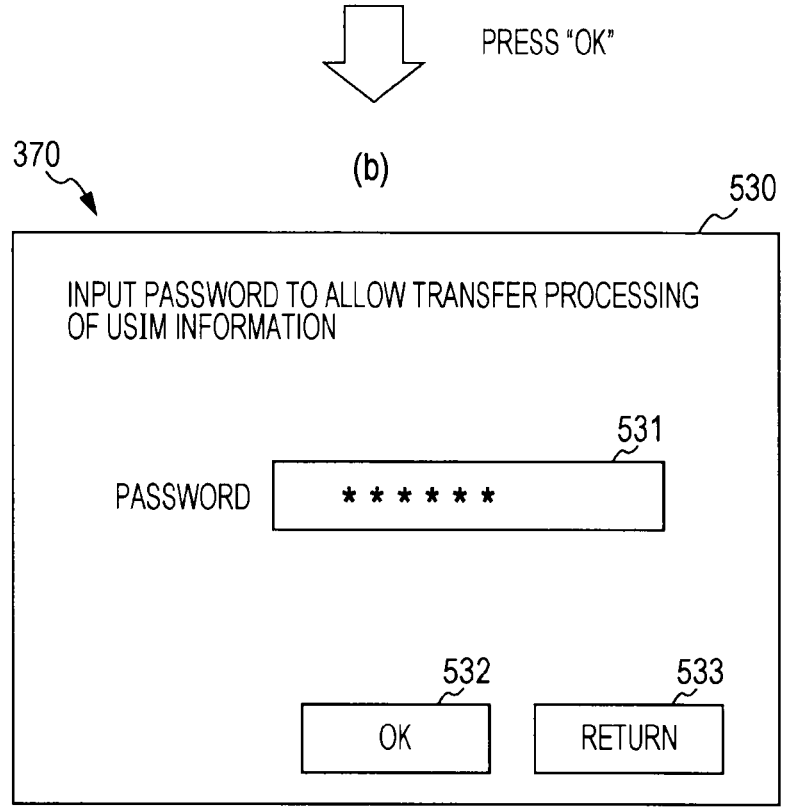

FIG. 12A

| WIRELESS TERMINAL DEVICE | SERVICE CAPABILITY 601 | DATA COMMUNICATION CAPABILITY 602 |
|---|---|---|
| FIRST WIRELESS TERMINAL DEVICE | CALL | – |
| | DATA COMMUNICATION | 1 Mbps |
| SECOND WIRELESS TERMINAL DEVICE | DATA COMMUNICATION | 1 Mbps |
| THIRD WIRELESS TERMINAL DEVICE | DATA COMMUNICATION | 100 Mbps |

| | WIRELESS TERMINAL DEVICE IDENTIFICATION INFORMATION 611 | SERVICE CAPABILITY 612 | DATA COMMUNICATION CAPABILITY 613 | UNIT PRICE 614 | UNIT 615 |
|---|---|---|---|---|---|
| 1 | FIRST WIRELESS TERMINAL DEVICE | CALL | – | 5 | ¢/MINUTE |
| | | DATA COMMUNICATION | 1 Mbps | 0.03 | ¢/PACKET |
| 2 | SECOND WIRELESS TERMINAL DEVICE | DATA COMMUNICATION | 1 Mbps | 0.02 | ¢/PACKET |
| 3 | THIRD WIRELESS TERMINAL DEVICE | DATA COMMUNICATION | 100 Mbps | 0.01 | ¢/PACKET |
| | TRANSFER OF USIM INFORMATION USAGE RIGHT | | | 10 | ¢/TRANSFER |

| TRANSFER HISTORY AND USAGE HISTORY | SERVICE USED | ADDITIONAL FEE | ACCUMULATED FEE |
|---|---|---|---|
| 10 MINUTE CALL (FIRST WIRELESS COMMUNICATION DEVICE) | CALL | ¢50 | ¢50 |

⇩ TRANSFER USAGE RIGHT OF USIM INFORMATION (FIRST WIRELESS TERMINAL DEVICE → SECOND WIRELESS TERMINAL DEVICE)

(b)

| TRANSFER HISTORY AND USAGE HISTORY | SERVICE USED | ADDITIONAL FEE | ACCUMULATED FEE |
|---|---|---|---|
| CHANGE OF USIM INFORMATION USAGE RIGHT | - | ¢10 | ¢60 |
| DATA COMMUNICATION WORTH 100 PACKETS (SECOND WIRELESS TERMINAL DEVICE) | ELECTRONIC BOOK DOWNLOAD | ¢2 | ¢62 |

⇩ TRANSFER USAGE RIGHT OF USIM INFORMATION (SECOND WIRELESS TERMINAL DEVICE → THIRD WIRELESS TERMINAL DEVICE)

(c)

| TRANSFER HISTORY AND USAGE HISTORY | SERVICE USED | ADDITIONAL FEE | ACCUMULATED FEE |
|---|---|---|---|
| CHANGE OF USIM INFORMATION USAGE RIGHT | - | ¢10 | ¢72 |
| DATA COMMUNICATION WORTH 1000 PACKETS (SECOND WIRELESS TERMINAL DEVICE) | MUSIC CONTENT DOWNLOAD | ¢10 | ¢82 |

| NUMBER OF TIMES TRANSFERRED WITHIN PREDETERMINED PERIOD | ADDED FEE |
|---|---|
| LESS THAN Nmin | Xmin |
| Nmin OR MORE LESS THAN Nmax | Xmin + (N − Nmin) × X(N) |
| Nmax OR MORE | Xmax |

FIG. 17A

| WIRELESS TERMINAL DEVICE | SERVICE CAPABILITY ~601 | DATA COMMUNICATION CAPABILITY ~602 | APPLICABILITY OF DISCOUNTED FEE ~603 |
|---|---|---|---|
| FIRST WIRELESS TERMINAL DEVICE | CALL | 1 Mbps | N/A |
| | DATA COMMUNICATION | | |
| SECOND WIRELESS TERMINAL DEVICE | DATA COMMUNICATION | 1 Mbps | ✓ |
| THIRD WIRELESS TERMINAL DEVICE | DATA COMMUNICATION | 100 Mbps | ✓ |

| | WIRELESS TERMINAL DEVICE IDENTIFICATION INFORMATION ~611 | SERVICE CAPABILITY ~612 | DATA COMMUNICATION CAPABILITY ~613 | UNIT PRICE ~614 | UNIT ~615 | APPLICABILITY OF DISCOUNTED FEE ~616 |
|---|---|---|---|---|---|---|
| 1 | FIRST WIRELESS TERMINAL DEVICE | CALL | – | 5 | ¢/MINUTE | N/A |
| | | DATA COMMUNICATION | 1 Mbps | 0.03 | ¢/PACKET | |
| 2 | SECOND WIRELESS TERMINAL DEVICE | DATA COMMUNICATION | 1 Mbps | 0.02 | ¢/PACKET | ✓ |
| 3 | THIRD WIRELESS TERMINAL DEVICE | DATA COMMUNICATION | 100 Mbps | 0.01 | ¢/PACKET | ✓ |
| | TRANSFER OF USIM INFORMATION USAGE RIGHT | | | 10 | ¢/TRANSFER | – |

| TRANSFER HISTORY AND USAGE HISTORY | SERVICE USED | ADDITIONAL FEE | ACCUMULATED FEE |
|---|---|---|---|
| 10 MINUTE CALL (FIRST WIRELESS COMMUNICATION DEVICE) | CALL | ¢50 | ¢50 |

⇩ TRANSFER USAGE RIGHT OF USIM INFORMATION
(FIRST WIRELESS TERMINAL DEVICE → SECOND WIRELESS TERMINAL DEVICE)

(b)

| TRANSFER HISTORY AND USAGE HISTORY | SERVICE USED | ADDITIONAL FEE | ACCUMULATED FEE |
|---|---|---|---|
| CHANGE OF USIM INFORMATION USAGE RIGHT | – | ¢10 | ¢60 |
| DATA COMMUNICATION WORTH 100 PACKETS (SECOND WIRELESS TERMINAL DEVICE) | ELECTRONIC BOOK DOWNLOAD | ¢1 | ¢61 |

⇩ TRANSFER USAGE RIGHT OF USIM INFORMATION
(SECOND WIRELESS TERMINAL DEVICE → THIRD WIRELESS TERMINAL DEVICE)

(c)

| TRANSFER HISTORY AND USAGE HISTORY | SERVICE USED | ADDITIONAL FEE | ACCUMULATED FEE |
|---|---|---|---|
| CHANGE OF USIM INFORMATION USAGE RIGHT | – | ¢10 | ¢71 |
| DATA COMMUNICATION WORTH 1000 PACKETS (SECOND WIRELESS TERMINAL DEVICE) | MUSIC CONTENT DOWNLOAD | ¢5 | ¢76 |

FIG. 19

| TRANSFER SOURCE WIRELESS TERMINAL DEVICE | TRANSFER DESTINATION WIRELESS TERMINAL DEVICE | ADDED FEES |
|---|---|---|
| PRODUCT OF PREDETERMINED COMPANY | PRODUCT OF PREDETERMINED COMPANY | X1 |
| PRODUCT OF COMPANY OTHER THAN PREDETERMINED COMPANY | PRODUCT OF PREDETERMINED COMPANY | X2 |
| PRODUCT OF PREDETERMINED COMPANY | PRODUCT OF COMPANY OTHER THAN PREDETERMINED COMPANY | X3 |
| PRODUCT OF COMPANY OTHER THAN PREDETERMINED COMPANY | PRODUCT OF COMPANY OTHER THAN PREDETERMINED COMPANY | X3 |

FIG. 21

| SUBTRACTION CONDITIONS | SUBTRACTION AMOUNT |
|---|---|
| USAGE AMOUNT (ACCUMULATED FEE) OF TRANSFER DESTINATION IS Y1 OR MORE | X5 |
| TRANSFER DESTINATION USES PREDETERMINED SERVICE | X6 |
| USAGE AMOUNT (ACCUMULATED FEE) OF TRANSFER SOURCE IS Y2 OR MORE | X5 |
| TRANSFER SOURCE USES PREDETERMINED SERVICE | X6 |

| | TELEPHONE NUMBER 221 | E-MAIL ADDRESS 222 | TERMINAL IDENTIFICATION INFORMATION 223 | VALID/INVALID INFORMATION 224 |
|---|---|---|---|---|
| 1 | 600-111-XXXX | aaa@bbb.cc.jp | IME#1 | INVALID |
| 2 | 600-222-XXXX | ffff@bbb.cc.jp | IME#2 | VALID |
| 3 | 600-333-XXXX | gggg@ccc.dd.jp | IME#3 | INVALID |
| ... | ... | ... | ... | ... |
| M | 600-XXX-XXXX | hhhh@xxx.yy.jp | IME#M | INVALID |

225

INFORMATION PROCESSING DEVICE, COMMUNICATION SYSTEM, AND BILLING METHOD FOR WIRELESS TERMINAL DEVICE

BACKGROUND

The present disclosure relates to an information processing device, and particularly relates to an information processing device for calculating fees relating to a wireless device connecting to a public wireless network, a communication system, and a billing method for wireless terminal devices.

Wireless terminal devices which connect to a public wireless network have come into widespread use. Examples of portable type wireless terminal devices include cellular telephone devices, wireless terminal devices specifically for data communication, and so forth. Also, examples of fixed wireless terminal devices include wireless terminal devices designed to collect data from vending machines.

Also, as of recent, many nations and regions have several mobile network operators which provide wireless connection services for wireless terminal devices. Now, in order for a wireless terminal device to connect to a public wireless network, the wireless terminal device has to have a card which a mobile network operator issues, including subscription authentication information attached thereto. This card is called a Universal Integrated Circuit Card (hereinafter referred to simply as "UICC").

Also, technology for using UICCs attached to wireless terminal devices in this way to store other information has been proposed. For example, a communication system has been proposed where UICCs are provided with credit functions to handle electronic money and so forth, large-scale memory card functions, and so forth, in addition to SIM functions handling subscriber information (Japanese Unexamined Patent Application Publication No. 2008-210301).

SUMMARY

With the aforementioned related art, UICCs are provided with credit functions, large-scale memory card functions, and so forth, in addition to SIM functions, so various types of services relating to wireless terminal devices can be integrated on the UICC.

Now, with the aforementioned related art, when being provided with wireless connection services, a wireless terminal device can only be provided with wireless connection services provided by the mobile network operator which has issued the UICC attached to the wireless terminal device (except for special cases such as emergencies). Also, as of recent, there are more users who personally have multiple wireless terminal devices. One arrangement that can be conceived for a user having such multiple wireless terminal devices is to attach a UICC to each of the wireless terminal devices which the user uses. Another arrangement that can be conceived is to share one UICC among the multiple wireless terminal devices.

However, in attaching UICCs to each of the wireless terminal devices to be used places a monetary burden on the user for the fees relating to the wireless connection service, for each extra UICC. On the other hand, sharing one UICC among multiple wireless terminal devices means that the UICC has to be detached/reattached among the multiple wireless terminal devices, which can be a troublesome task.

Accordingly, it can be conceived to transfer subscription authentication information (or usage right thereof) via a wireless line, thereby sharing the subscription authentication information between the multiple wireless terminal devices. In the event of sharing subscription authentication information among multiple wireless terminal devices in this way, the wireless terminal devices may each have different communication functions and so forth, so it is important that fees (communication charges and the like) corresponding to the wireless terminal devices using the subscription authentication information be appropriately calculated.

There has been found demand for appropriately calculating fees relating to subscription authentication information shared among multiple wireless terminal devices.

According to an embodiment of the disclosure, provided is: an information processing device including a detecting unit configure to detect, with regard to a plurality of wireless terminal devices sharing a usage right of subscription authentication information relating to a mobile network operator which provides wireless connection services, transfer of the usage right among the wireless terminal devices, and a calculating unit configured to, in the event that transfer of the usage right is detected, calculate fees relating to the subscription authentication information occurring after the transfer, based on billing information set for the wireless terminal device to which the usage right has been transferred; a billing method of a wireless terminal device thereby; and a program for causing a computer to execute the method. This is advantageous in that transfer of a usage right of subscription authentication information among the wireless terminal devices is detected, and in the event that transfer of the usage right is detected, fees relating to the subscription authentication information occurring after the transfer are calculated, based on billing information set for the wireless terminal device to which the usage right has been transferred.

The calculating unit may take history relating to usage of the subscription authentication information regarding the wireless terminal devices of which the usage right has been transferred, as usage history of the subscription authentication information, and calculates fees relating to the subscription authentication information based on the transfer history of the usage right that has been detected, the usage history of the subscription authentication information, and the billing information. This is advantageous in that fees relating to the subscription authentication information can be calculated based on the transfer history of the usage right that has been detected, the usage history of the subscription authentication information, and the billing information.

The calculating unit may calculate fees relating to the subscription authentication information using, as the transfer history of the usage right that has been detected, the number of times that the usage right has been transferred. This is advantageous in that fees relating to the subscription authentication information can be calculated using the number of times that the usage right of the subscription authentication information has been transferred.

The calculating unit may calculate fees relating to the subscription authentication information using, as the transfer history of the usage right that has been detected, an upper limit value and lower limit value identified by the number of times that the usage right has been transferred. This is advantageous in that fees relating to the subscription authentication information can be calculated using an upper limit value and lower limit value identified by the number of times that the usage right has been transferred.

The calculating unit may calculate fees relating to the subscription authentication information using, as the transfer history of the usage right that has been detected, the types of the wireless terminal devices regarding which the usage right has been transferred. This is advantageous in that fees relating to the subscription authentication information can be calculated using the types of the wireless terminal devices regarding which the usage right has been transferred.

The calculating unit may calculate fees relating to the subscription authentication information using, as the transfer history of the usage right that has been detected, information indicating whether or not at least one of a transfer source wireless terminal device and a transfer destination wireless terminal device, regarding which the usage right has been transferred, is a wireless terminal device of a specific type. This is advantageous in that fees relating to the subscription authentication information can be calculated using information indicating whether or not at least one of a transfer source wireless terminal device and a transfer destination wireless terminal device, regarding which the usage right has been transferred, is a wireless terminal device of a specific type.

The calculating unit may calculate fees relating to the subscription authentication information using, as the transfer history of the usage right that has been detected, the contents of services used by the wireless terminal devices regarding which the usage right has been transferred. This is advantageous in that fees relating to the subscription authentication information can be calculated using the contents of services used by the wireless terminal devices regarding which the usage right has been transferred.

The calculating unit may calculate fees relating to the subscription authentication information using, as the transfer history of the usage right that has been detected, information indicating whether or not there is usage history of a specific service by at least one of a transfer source wireless terminal device and a transfer destination wireless terminal device, regarding which the usage right has been transferred. This is advantageous in that fees relating to the subscription authentication information can be calculated using information indicating whether or not there is usage history of a specific service by at least one of a transfer source wireless terminal device and a transfer destination wireless terminal device, regarding which the usage right has been transferred.

The calculating unit may calculate fees relating to the subscription authentication information using, as the transfer history of the usage right that has been detected, information indicating the amount of usage of a service used by at least one of a transfer source wireless terminal device and a transfer destination wireless terminal device, regarding which the usage right has been transferred. This is advantageous in that fees relating to the subscription authentication information can be calculated using information indicating the amount of usage of a service used by at least one of a transfer source wireless terminal device and a transfer destination wireless terminal device, regarding which the usage right has been transferred.

The calculating unit may calculate fees relating to the subscription authentication information using, as the usage history of the subscription authentication information that has been detected, at least one of the contents of services which can be used by the wireless terminal devices regarding which the usage right has been transferred, the communication time and communication amount used by each of the wireless terminal devices, and capabilities relating to wireless communication which each wireless terminal device has. This is advantageous in that fees relating to the subscription authentication information can be calculated using at least one of the contents of services which can be used by the wireless terminal devices regarding which the usage right has been transferred, the communication time and communication amount used by each of the wireless terminal devices, and capabilities relating to wireless communication which each wireless terminal device has.

The detecting unit may detect the transfer of the usage right in the event that the usage right of the subscription authentication information has been transferred among the wireless terminal devices via a wireless line. This is advantageous in that in the event that the usage right of the subscription authentication information is transferred among the wireless terminal devices via the wireless line, transfer of the usage right is detected.

According to an embodiment of the disclosure, provided is: an information processing device including a detecting unit configure to detect, with regard to a plurality of wireless terminal devices sharing a usage right of subscription authentication information relating to a mobile network operator which provides wireless connection services, transfer of the usage right among the wireless terminal devices, and a calculating unit configured to calculate fees relating to the subscription authentication information based on transfer history of the usage right which has been detected; a billing method of a wireless terminal device thereby; and a program for causing a computer to execute the method. This is advantageous in that transfer of a usage right of subscription authentication information among the wireless terminal devices is detected, and fees relating to the subscription authentication information are calculated based on transfer history of the usage right which has been detected.

According to an embodiment of the disclosure, provided is: a communication system including a plurality of wireless terminal devices which share a usage right of subscription authentication information relating to a mobile network operator which provides wireless connection services, by transferring the usage right among the wireless terminal devices via a wireless line, and an information processing device having a detecting unit configure to detect, with regard to the plurality of wireless terminal devices, transfer of the usage right among the wireless terminal devices, and a calculating unit configured to, in the event that transfer of the usage right is detected, calculate fees relating to the subscription authentication information occurring after the transfer, based on billing information set for the wireless terminal device to which the usage right has been transferred; a billing method of a wireless terminal device thereby; and a program for causing a computer to execute the method. This is advantageous in that transfer of a usage right of subscription authentication information among the wireless terminal devices is detected, and in the event that transfer of the usage right is detected, fees relating to the subscription authentication information occurring after the transfer are calculated, based on billing information set for the wireless terminal device to which the usage right has been transferred.

According to the above configurations, fees relating to subscription authentication information shared among multiple wireless terminal devices can be appropriately calculated.

BRIEF DESCRIPTION OF THE DRAWINGS

FIG. 2 is a block diagram illustrating a system configuration example of a communication system according to the first embodiment;

FIG. 4 is a diagram schematically illustrating a wireless terminal device management database according to the first embodiment;

FIG. 6 is a display screen example displayed on the first wireless terminal device and a second wireless terminal device according to the first embodiment;

FIG. 7 is a display screen example displayed on the first wireless terminal device and a second wireless terminal device according to the first embodiment;

FIGS. 12A and 12B schematically illustrate an example of specifications of the wireless terminal devices, and an example of the contents of a billing information database, respectively, according to the first embodiment;

FIG. 13 is a diagram schematically illustrating the transition of fees relating to USIM information calculated by a calculating unit according to the first embodiment;

FIGS. 17A and 17B schematically illustrate an example of specifications of wireless terminal devices, and an example of the contents of another billing information database, respectively, according to a second embodiment of the disclosure;

FIG. 18 is a diagram schematically illustrating the transition of fees relating to USIM information calculated by a calculating unit according to the second embodiment;

FIG. 19 is a simplified diagram illustrating an example of added fees in the billing processing by the billing processing unit according to the second embodiment;

FIG. 21 is a simplified diagram illustrating an example of added fees in the billing processing by the billing processing unit according to the second embodiment;

FIG. 24 is a diagram schematically illustrating a wireless terminal device management database according to the modification.

DETAILED DESCRIPTION OF EMBODIMENTS

Figure 1A:
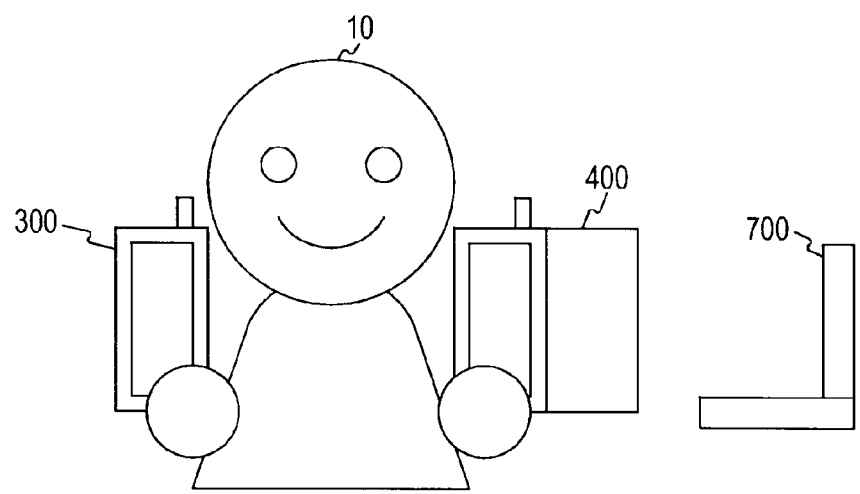
FIGS. 1A and 1B are simplified diagrams illustrating a usage example of multiple wireless terminal devices according to a first embodiment of the present disclosure.
Figure 1B:
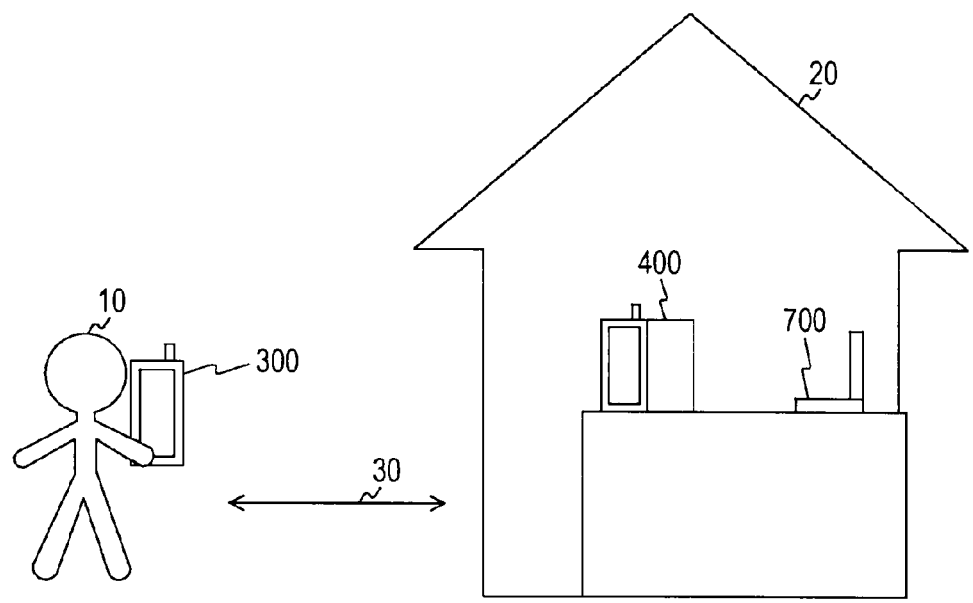

Embodiments for carrying out the present disclosure (hereinafter, referred to simply as "embodiments") will be described. Description will proceed in the following order.
1. First Embodiment (billing control: example of performing billing processing for multiple wireless terminal devices sharing usage right of a USIM (Universal Subscriber Identity Module)
2. Second Embodiment (billing control: example of alleviating fees of a wireless terminal device if certain conditions are met)
3. Modifications 1. First Embodiment Usage Example of Wireless Terminal Device FIGS. 1A and 1B are simplified drawings illustrating a usage example of multiple wireless terminal devices according to a first embodiment of the present disclosure. FIG. 1A illustrates a state in which a single user 10 has a first wireless terminal device 300, a second wireless terminal device 400, and a third wireless terminal device 700. FIG. 1B illustrates a state in which the user 10 has one wireless terminal device (the first wireless terminal device 300) in his/her hand, with the other wireless terminal devices (the second wireless terminal device 400 and third wireless terminal device 700) being placed at a relatively remote location (away by a distance indicated by an arrow 30). For example, we may assume a case where the user 10 has forgotten the second wireless terminal device 400 and third wireless terminal device 700 at home 20 and is using the first wireless terminal device 300 at work.

The first wireless terminal device 300 is, for example, a cellular telephone (e.g., a smartphone), the second wireless terminal device 400 is, for example, is an e-book reader having wireless communication functions, and the third wireless terminal device 700 is, for example, an information processing device (e.g., a laptop personal computer) having wireless communication functions.

Configuration Example of Communication System

FIG. 2 is a block diagram illustrating a system configuration example of a communication system 100 according to the first embodiment of the disclosure. The communication system 100 includes a Web server 101, an electronic book download server 102, a music content download server 103, a public line network 110, and a network control device 200. The communication system 100 also includes base stations 231 through 233, and the first wireless terminal device 300, second wireless terminal device 400, and third wireless terminal device 700.

The Web server 101 is a server which is connected to the public line network 110 and enables access to various types of Web sites in accordance with requests from the wireless terminal devices. The electronic book download server 102 is a server which is connected to the public line network 110 and supplies various types of electronic books (publications (contents) which can be displayed on the display units of the wireless terminal devices and read) in accordance with requests from the wireless terminal devices. The music content download server 103 is a server which is connected to the public line network 110 and supplies various types of music contents in accordance with requests from the wireless terminal devices.

The public line network 110 is a public line network such as a telephone network, the Internet, or the like. Also, the public line network 110 and network control device 200 are connected by way of an unshown gateway.

The base stations 231 through 233 are mobile communication base stations (Node B) which connect the first wireless terminal device 300, second wireless terminal device 400, third wireless terminal device 700, and network control device 200, via wireless lines 251 through 253.

For example, with the communication system 100, the first wireless terminal device 300 is connected to the base station 231 via the wireless line 251, and is connected to the network control device 200 via the base station 231. In the same way, the second wireless terminal device 400 is connected to the base station 232 via the wireless line 252, and is connected to the network control device 200 via the base station 232. Also, the third wireless terminal device 700 is connected to the base station 233 via the wireless line 253, and is connected to the network control device 200 via the base station 233. Note that each of the first wireless terminal device 300, second wireless terminal device 400, and third wireless terminal device 700 can be connected to any of the base stations 231 through 233, depending on where they are being used.

The network control device 200 is a communication control device managed by a mobile network operator providing a wireless connection service, having an authentication control unit 210, wireless terminal device management database 220, and billing processing unit 600.

The authentication control unit 210 performs authentication control of the wireless terminal devices connected via the base stations 231 through 233. Now, of the wireless terminal devices connected via the base stations 231 through 233, the authentication control unit 210 authenticates only wireless terminal devices having valid USIM information (subscriber authentication information), except for special cases. Now, USIM information is an example of subscriber authentication information, and is information including the information of a telephone subscriber and information of an authentication key. Note that special cases will be described in detail with reference to FIG. 3. Also, the network control device 200 connects authenticated wireless terminal devices to the public line network 110 via a gateway (not shown). In this case, the authentication control unit 210 outputs connection information relating to the authenticated wireless terminal device (e.g., connection service (call or data communication), connection time) of the authenticated wireless terminal device to the billing processing unit 600.

The wireless terminal device management database 220 is a database for the mobile network operator which provides the wireless connection service to manage one or multiple wireless terminal devices. Note that the wireless terminal device management database 220 will be described later in detail with reference to FIG. 4 and so forth.

The billing processing unit 600 performs billing processing related to the wireless terminal devices connected to the network control device 200. Note that the billing processing unit 600 will be described in detail with reference to FIG. 11. The network control device 200 and the billing processing unit 600 thereof are an example of an information processing device referred to in the Summary.

Connection Example for USIM Information Transfer Request

Now, a connection method for connecting a wireless terminal device which does not have valid USIM information to the public line network 110 will be described. Currently, with general wireless terminal devices, connection for emergency usages (Emergency Call) can be made even if the wireless terminal device does not have USIM information (i.e., a UICC is not attached). Examples of emergency usage include calls to Police and Fire (e.g., 9-1-1 in North America).

For example, let us assume a wireless terminal device which does not hold USIM information and is not in a call state. This wireless terminal device is in a state of having selected any base station capable of accepting (e.g., a base station with strong signal), regardless of mobile network operator. This state is the "Camped on Any Cell Mode" within the "Idle Mode". In this state, only in the event that a pre-registered emergency call telephone number (emergency call number) is input by the user, the wireless terminal device transmits an EMERGENCY SETUP signal to a Mobile-services Switching Center (hereinafter also referred to as "MSC") via a mobile communication base station and a Radio Network Controller (hereinafter also referred to as "RNC"). Here, the RNC corresponds to the network control device 200, for example, and the MSC is the fixed network (public line network 110) and mobile communication network interface. Thus, the wireless terminal device can escape the Idle Mode and enter a Connected Mode, whereby the call can be made.

With the first embodiment of the disclosure, the above-described connection method is extended, thereby enabling temporary access to a network (public line network 110) in order to make a transfer request for USIM information (usage right of USIM information). For example, the network can be temporarily accessed by the user dialing a dedicated telephone number for making a transfer request for USIM information. Also, in the event that the user has operated a menu screen (e.g., a display screen 500 shown in (a) in FIG. 6) or an operating member (button or the like) provided on the side of the device, the dedicated telephone number can be called so as to enable temporary access to the network.

Random access, which is stipulated in the 3GPP standard for mobile communication systems, is used for this network access. For example, priority (Access Category) can be set for random access, and a priority (Access Category) can be set for USIM information transfer requests. Accordingly, a priority (Access Category) which is different from emergency usage (Emergency Call) can be set.

For example, in the event that the requesting wireless terminal device has accessed the network with a priority (Access Category) for USIM information transfer requests, a limited network connection is provided to the requesting wireless terminal device. After permission of the limited connection to the requesting wireless terminal device, information relating to the transfer request of USIM information from the wireless terminal device regarding which the transfer request of USIM information has been made (requestee wireless terminal device) is notified to the requesting wireless terminal device.

Thus, in the event that a requesting wireless terminal device which does not hold valid USIM information has connected to the network with a limited connection, the network maintains the limited connection with the requesting wireless terminal device. Along with maintaining the limited connection, the network secures a normal connection with the requestee wireless terminal device, thereby enabling communication of information relating to the transfer request for USIM information.

Figure 3:
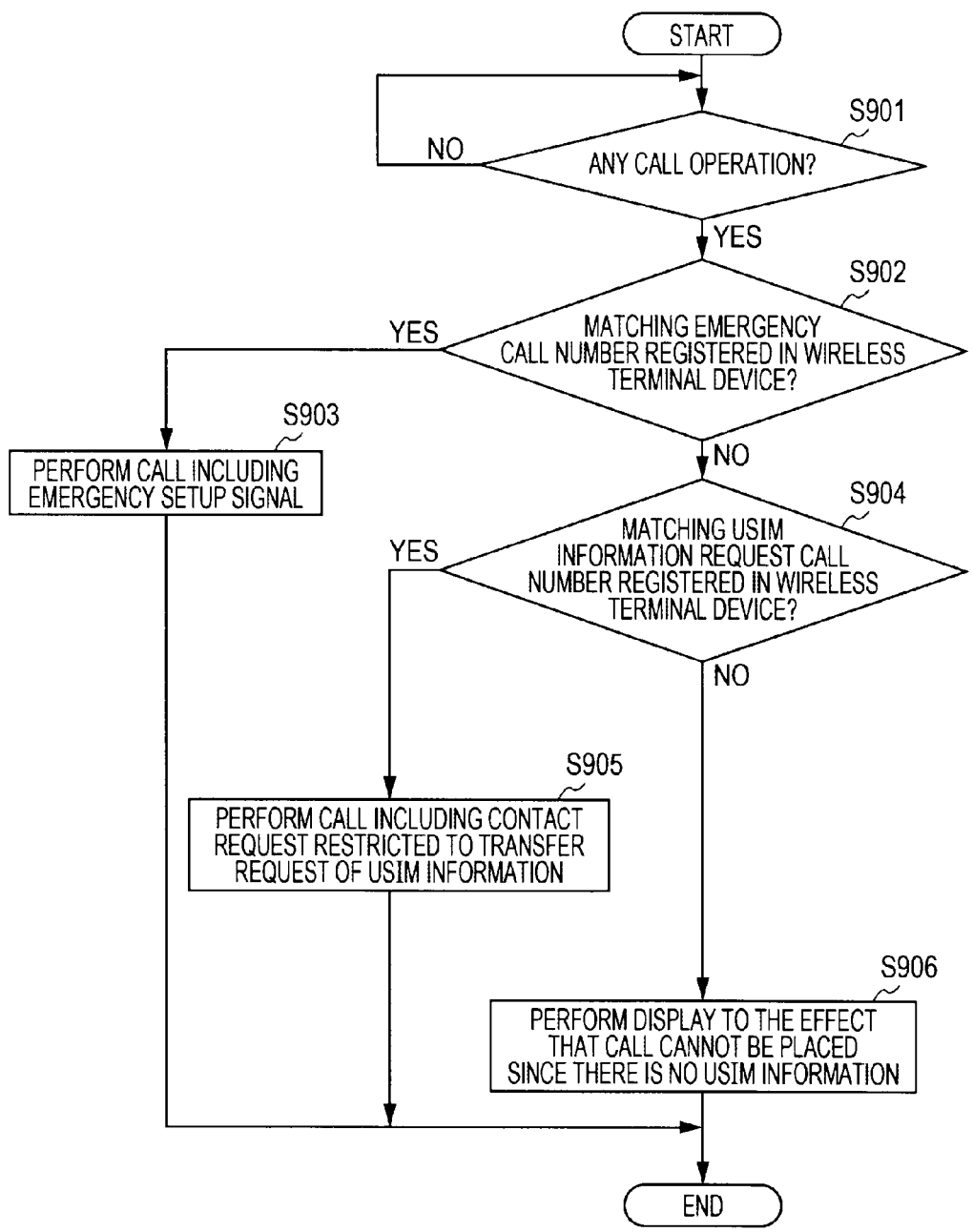
FIG. 3 is a flowchart illustrating an example of processing procedures for communication processing with the wireless terminal devices according to the first embodiment.

FIG. 3 is a flowchart illustrating an example of processing procedures for communication processing with a wireless terminal device according to the first embodiment of the present disclosure. With this example, description will be made regarding an example of a case of performing limited connection by a call operation made at the wireless terminal device not holding valid USIM information. In the example, a USIM information request call number is registered in the wireless terminal device for the limited connection, and this USIM information request call number is called to make the limited connection.

First, determination is made regarding whether or not a call operation has been made (step S901), and in the event that a call operation has not been made, monitoring is continued.

In the event that a call operation has been made (Yes in step S901) determination is made regarding whether or not the number input by the call operation matches an emergency call number registered in the wireless terminal device (step S902). In the event that the number input by the call operation matches an emergency call number (Yes in step S902), a call is made including an EMERGENCY SETUP signal (step S903). Thus, the wireless terminal device escapes the Idle Mode and enters the Connected Mode, whereby the call can be made.

On the other hand, in the event that the number input by the call operation does not match the emergency call number (No in step S902), determination is made regarding whether or not the number input by the call operation matches the USIM information request call number registered in the wireless terminal device. In the event that the number input by the call operation matches the USIM information request call number (step S904), a call is made including a connection request limited to a USIM information transfer request (step S905). Thus, the wireless terminal device escapes the Idle Mode and enters the Connected Mode, whereby the call can be made.

Note that in the event that the number input by the call operation does not match the USIM information request call number (No in step S904), a display is made to the effect that the call may not be made since valid USIM information is not held.

Configuration Example of Wireless Terminal Device Management Database

FIG. 4 is a diagram schematically illustrating the wireless terminal device management database 220. The wireless terminal device management database 220 is a database which manages the USIM information held in each of the first wireless terminal device 300, second wireless terminal device 400, and third wireless terminal device 700.

Specifically, the wireless terminal device management database 220 has recorded therein the items of telephone number 221, e-mail address 222, terminal identification information 223, and valid/invalid information 224, in a correlated manner. These are recorded in the wireless terminal device management database 220 based on operation input of the user 10 using the first wireless terminal device 300, second wireless terminal device 400, or third wireless terminal device 700. Alternatively, the mobile network operator providing wireless connection services may record these in the wireless terminal device management database 220 based on the contract with the user 10.

Stored under telephone number 221 are telephone numbers of wireless terminal devices, and stored under e-mail address 222 are e-mail addresses of the wireless terminal devices. Note that the telephone numbers and e-mail addresses of the wireless terminal devices are identification information for identifying wireless terminal devices, and are used for making transfer requests for USIM information (usage right of USIM information).

Stored under terminal identification information 223 are terminal identification numbers of the wireless terminal devices. The terminal identification information is information for identifying the wireless terminal device, and includes IMEI (International Mobile Equipment Identity), for example. Note that in FIG. 4, "IME#1" under terminal identification information 223 corresponds to the first wireless terminal device 300, "IME#2" under terminal identification information 223 corresponds to the second wireless terminal device 400, and "IME#3" under terminal identification information 223 corresponds to the third wireless terminal device 700.

Stored under valid/invalid information 224 is information indicating whether the USIM information held in the wireless terminal device is valid or invalid. To facilitate description, in FIG. 4 the wireless terminal device regarding which the USIM information is valid is indicated by "valid", and the wireless terminal devices regarding which the USIM information is invalid are indicated by "invalid". Also, all of the information in the wireless terminal device management database 220 regarding the wireless terminal device of which the USIM information is valid is surrounded by a heavy rectangle 225.

Configuration Example of Wireless Terminal Device

Figure 5:
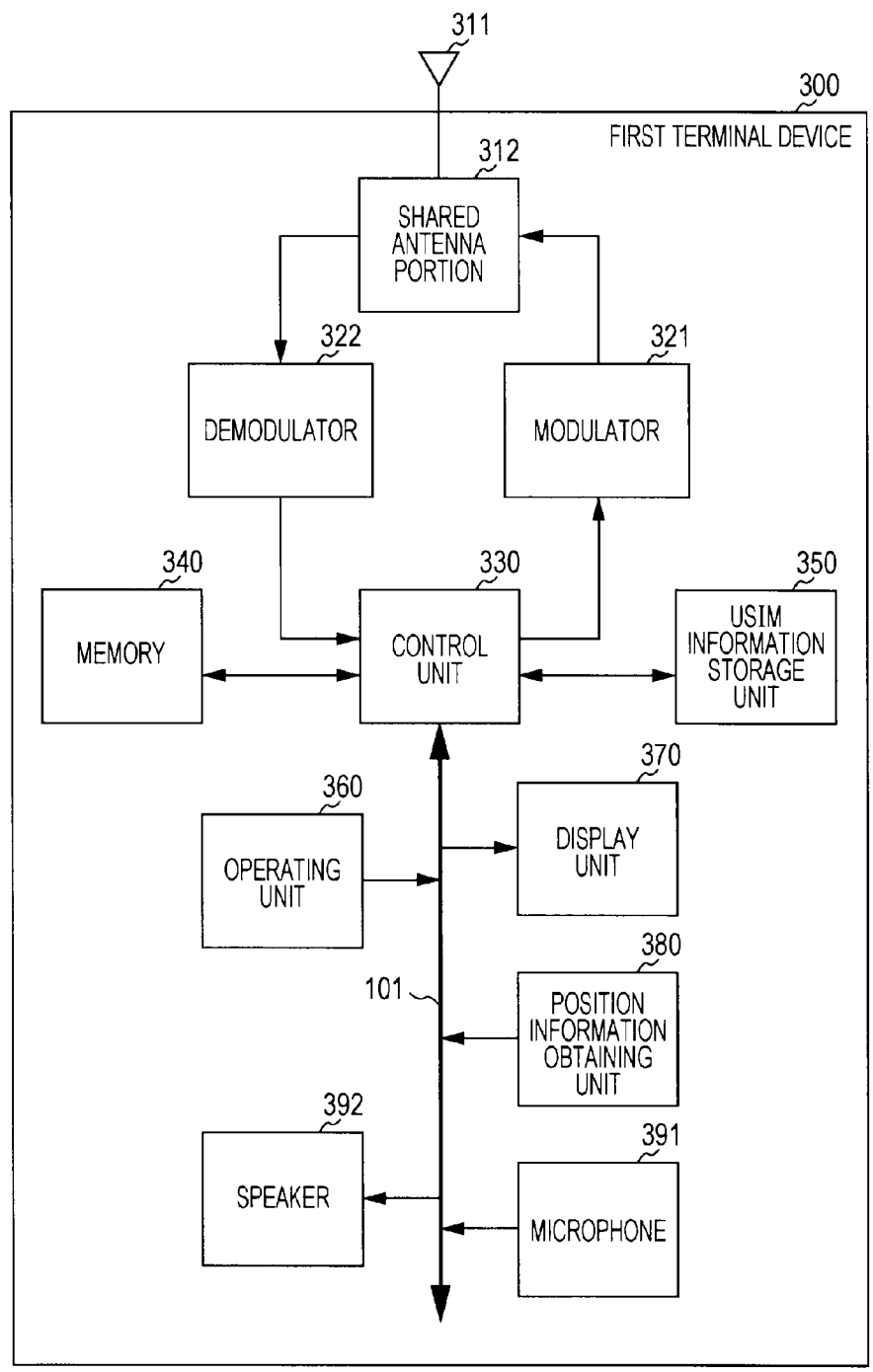
FIG. 5 is a block diagram illustrating an internal configuration example of a first wireless terminal device according to the first embodiment.

FIG. 5 is a block diagram illustrating an internal configuration example of the first wireless terminal device 300 according to the first embodiment of the present disclosure. Note that the internal configurations of the second wireless terminal device 400 and third wireless terminal device 700 are the same as that of the first wireless terminal device 300, so description thereof will be omitted here.

The first wireless terminal device 300 includes an antenna 311, an antenna shared portion 312, a modulator 321, a demodulator 322, a control unit 330, memory 340, a USIM information storage unit 350, an operating unit 360, a display unit 370, a position information obtaining unit 380, a microphone 391, and a speaker 392. The first wireless terminal device 300 is realized as, for example, a cellular telephone device capable of calls and data communication.

In the event that reception processing is performed for example, radio waves received at the antenna 311 pass through the antenna shared portion 312 and are demodulated at the demodulator 322, and the demodulated reception data is supplied to the control unit 330. In the event that the reception processing is call reception processing, the demodulated reception data (audio data) is output from the speaker 392 via the control unit 330 as audio.

Also, in the event that transmission processing is to be performed for example, the transmission data output by the control unit 330 is modulated by the modulator 321, and the modulated transmission data is transmitted through the antenna shared portion 312 and from the antenna 311. In the event that the transmission processing is call transmission processing, the audio data input from the microphone 391 is modulated at the modulator 321 via the control unit 330, and the modulated transmission data (audio data) is transmitted via the antenna shared portion 312 from the antenna 311.

The control unit 330 performs various types of processing based on control programs stored in the memory 340. The control unit 330 is configured of a microprocessor, for example. The control unit 330 is connected to the modulator 321 and demodulator 322 for example, and performs transmission/reception of various types of data performed with the network control device 200 connected via the base stations 231 through 233.

The memory 340 is memory for storing control programs for the control unit 330 to perform various types of control, transmission data, reception data, and so forth. The memory 340 is configured of, for example, ROM (Read Only Memory), RAM (Random Access Memory), or the like.

The USIM information storage unit 350 is memory holding USIM information (subscription authentication information). For the USIM information storage unit 350, a UICC may be used for example, or dedicated memory for securely holding the USIM information may be used. Note that in the case of using a UICC for the USIM information storage unit 350, one is used regarding which validation processing and invalidation processing of the USIM information can be performed, and not one in which the USIM information is fixedly written. That is to say, one capable of validation processing and invalidation processing of USIM information by the control unit 330, based on the transfer information received from the antenna 311 and demodulated, is used. Also, USIM information capable of rewriting processing is used. Note that validation processing and invalidation processing of USIM information stipulated in 3GPP (Third Generation Partnership Project) may be used for the validation processing and invalidation processing. Such processing is performed at cellular telephone shops.

Now, in the event of having received instruction operations (predetermined operations) at the operating unit 360 by the user, instructing a transfer request to request transfer of usage rights of the USIM information relating to the mobile network operator providing wireless connection services, the control unit 330 transmits the transfer request via the wireless line. This transfer request is a transfer request to request transfer usage right of the USIM information held in the USIM information storage unit 350 of another wireless terminal device. Also, the control unit 330 transmits a transfer request via the wireless line by way of a limited connection to perform only limited connection, without using USIM information, for example. Note that the usage right of USIM information is a right to use the USIM information. For example, the usage right for USIM information can be transferred by validation processing and invalidation processing of the USIM information. The usage right for USIM information can be transferred by transfer processing of the USIM information itself. Also, the usage right of USIM information can also be comprehended as a service usage right of the wireless terminal device. For example, whether or not a wireless terminal device has service usage rights can be determined by whether or not the wireless terminal device has USIM information usage rights.

Also, upon receiving transfer information (information for transferring the usage right of the USIM information) transmitted via the wireless line in response to the transfer request, the control unit 330 sets valid USIM information based on the received transfer information. This transfer information is transmitted by the authentication control unit 210, based on the contents of management of the wireless terminal device management database 220.

Also, in the event of transferring usage right of the USIM information by validation processing and invalidation processing of the USIM information, for example, validation information for making valid the USIM information held in the USIM information storage unit 350 is included in the transfer information. The control unit 330 sets valid USIM information by validating the USIM information held in the USIM information storage unit 350, based on validation information included in the received transfer information.

The network control device 200 performs control to validate the USIM information held in the USIM information storage unit 350, by transmitting the transfer information to the first wireless terminal device 300 in response to the transfer request. Also, the network control device 200 performs control to invalidate the USIM information held in the USIM information storage unit 350 of the second wireless terminal device 400.

Also, in the event of transferring the usage right of the USIM information by transfer processing of USIM information, for example, the USIM information held in the USIM information storage unit 350 of the second wireless terminal device 400 is included in the transfer information. In the event of performing this transfer, the control unit 330 transmits the transfer request to the second wireless terminal device 400. After transmitting the transfer request, the USIM information held in the second wireless terminal device 400 is invalidated, and the transfer information is transmitted from the second wireless terminal device 400 or the network control device 200. The control unit 330 then records the USIM information included in the received transfer information to the USIM information storage unit 350, thereby setting valid USIM information.

Also, in the event that the first wireless terminal device 300 is the transfer requestee, the control unit 330 transmits the transfer information to the transfer requester via the wireless line in the event that the transfer request has been received. In this case, in the event that the transfer request has been received, the control unit 330 displays a confirmation screen for the user to confirm transfer of the usage right of the USIM information held in the USIM information storage unit 350 (e.g., display screens 520 and 530 in FIG. 7). Also, after the confirmation screen has been displayed, in the event that an operation input permitting the transfer of the usage right of the USIM information held in the USIM information storage unit 350 has been accepted by the operating unit 360, the control unit 330 transmits the transfer information via the wireless line.

The operating unit 360 is an operation accepting unit for accepting operation input by user operations, and outputs signals corresponding to the operation input that has been accepted to the control unit 330. For example, the operating unit 360 has various keys such as alphanumeric keys, and accepts instruction operations (predetermined operations) by the user instructing a transfer request to request transfer of the usage right of the USIM information relating to the mobile network operator providing the wireless connection services.

The display unit 370 is a display unit which displays various types of information (text information, time information, etc.) based on control of the control unit 330. For example, the display unit 370 displays various information relating to the transfer processing of usage right of the USIM information (e.g., the display screens in FIGS. 6 and 7). Examples of display panels which can be used for the display unit 370 include organic EL (Electro Luminescence) panels, LCD (Liquid Crystal Display) panels, and so forth. Note that the operating unit 360 and display unit 370 may be integrally formed using a touch panel whereby operation input can be performed by the user bringing a finger thereof into contact or into close proximity therewith.

The position information obtaining unit 380 is for obtaining position information indicating the position where the first wireless terminal device 300 is, and outputs this obtained position information to the control unit 330. The position information obtaining unit 380 can be realized by a GPS (Global Positioning Satellite) unit which calculates position information based on GPS signals received by an unshown GPS signal reception antenna. The calculated position information includes various types of data relating to the latitude, longitude, altitude, and so forth, at the time of reception of the GPS signal. Also, a position information obtaining device which obtains position information by a position information obtaining method other than this may be used. For example, an arrangement may be made where a position information obtaining device is used to deduce position information based on access point information from nearby wireless LANs (Local Area Network), and obtain this position information.

Example of Communication Between the Devices

FIGS. 6 and 7 are diagrams illustrating display screen examples displayed on the first wireless terminal device 300 and second wireless terminal device 400 according to the first embodiment of the present disclosure. These display screens will be described in detail with reference to the sequence change in FIG. 8.

Figure 8:
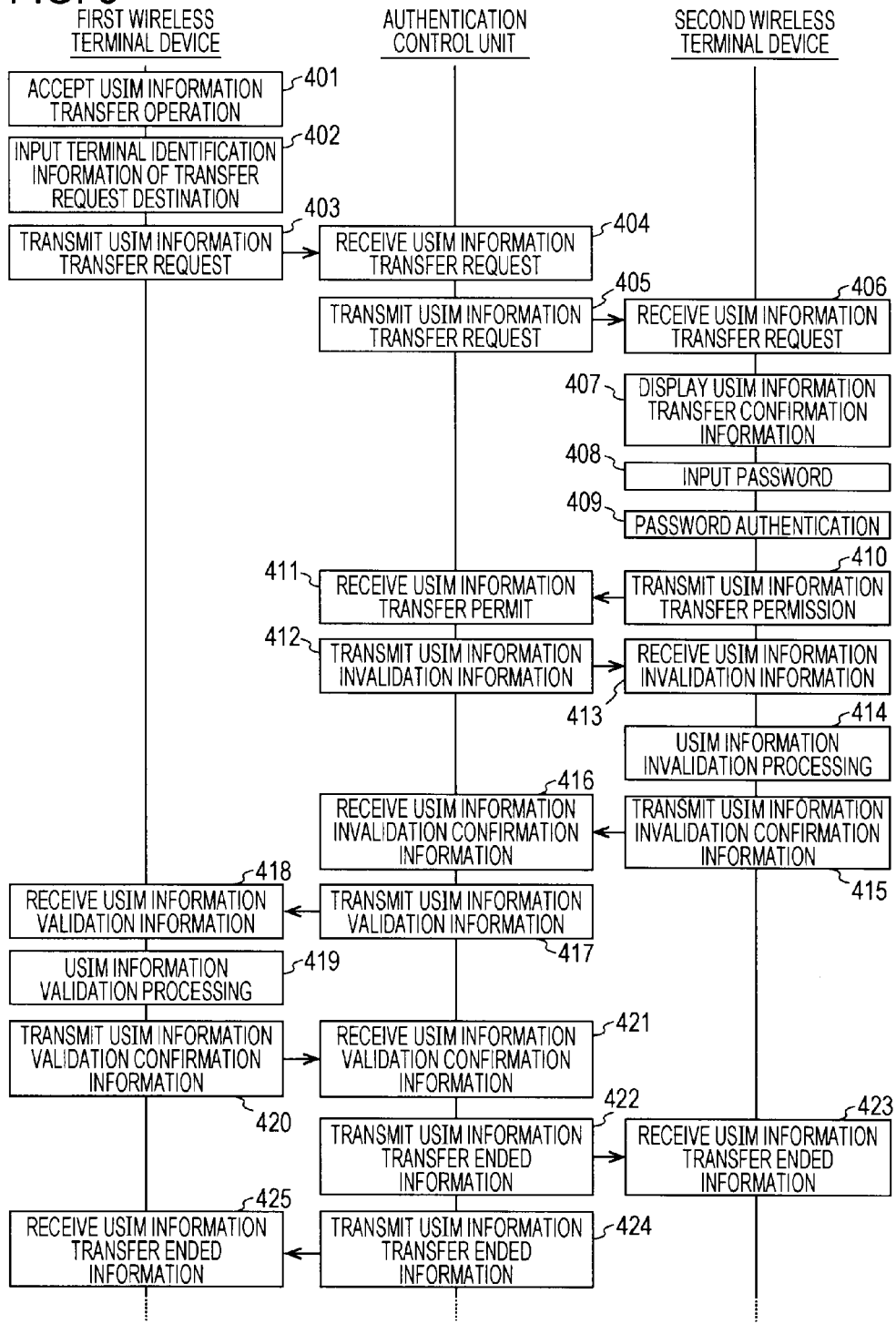
FIG. 8 is a sequence chart illustrating an example of processing procedures for communication processing performed among the devices making up the communication system according to the first embodiment.

FIG. 8 is a sequence chart illustrating an example of the communication processing among the devices making up the communication system 100 according to the first embodiment of the present disclosure. While just an example of communication processing between the first wireless terminal device 300 and second wireless terminal device 400 will be illustrated in FIGS. 6 through 8, this can be applied in the same way to the communication processing between other wireless terminal devices.

In FIG. 8, an example will be described where each of the first wireless terminal device 300 and second wireless terminal device 400 hold USIM information, and the USIM information usage right is transferred by validation/invalidation control at the authentication control unit 210 of the network control device 200. Also, with FIG. 8, an example will be described of communication processing where the second wireless terminal device 400 has valid USIM information, and the first wireless terminal device 300 makes a transfer request to the second wireless terminal device 400.

First, a display screen for performing USIM information transfer operations (operations for transfer request of USIM information usage right) is displayed on the display unit 370 of the first wireless terminal device 300. In FIG. 6, (a) illustrates an example of a display screen (display screen 500) to perform USIM information transfer operations. The display screen 500 is a display screen for selecting functions for the first wireless terminal device 300 to execute. Specifically, the display screen 500 includes a telephone button 501, a camera button 502, an e-mail button 503, a USIM information transfer button 504, an OK button 505, and a return button 506.

The telephone button 501 is a button pressed to use the telephone functions, the camera button 502 is a button pressed to use the camera functions, and the e-mail button 503 is a button pressed to use the e-mail functions. The USIM information transfer button 504 is a button pressed to transfer the valid USIM information usage rights held in the wireless terminal devices. Note that, in the event that valid USIM information is held in the USIM information storage unit 350, the USIM information transfer button 504 is not displayed. The OK button 505 is a button pressed after one of the telephone button 501, camera button 502, e-mail button 503, or USIM information transfer button 504 has been selected by pressing the respective button, to finalize the selection thereof. The return button 506 is a button pressed to return to the display screen displayed immediately before, for example. Note that this is true for the return buttons 514 and 533 in (b) in FIG. 6 and in (b) in FIG. 7.

Now, let us say that at the display screen 500 shown in (a) in FIG. 6, the OK button 505 has been pressed after the USIM information transfer button 504 has been pressed (401). In the event that such a USIM information transfer operation has been accepted (401), a display screen for inputting terminal identification information is displayed on the display unit 370 of the first wireless terminal device 300.

Now, (b) in FIG. 6 illustrates an example of a display screen (display screen 510) for inputting terminal identification information. The display screen 510 is a display screen for inputting terminal identification information to identify the wireless terminal device which is the transfer source for transferring the USIM information usage right. Specifically, the display screen 510 includes a telephone number input space 511, an e-mail address input space 512, an OK button 513, and a return button 514.

The telephone number input space 511 is a region for inputting the telephone number of the transfer source wireless terminal device as terminal identification information of the wireless terminal device serving as the transfer source to transfer the USIM information usage right.

The e-mail address input space 512 is a region for inputting the e-mail address of the transfer source wireless terminal device as terminal identification information of the wireless terminal device serving as the transfer source to transfer the USIM information usage right. In this example, one of the telephone number and e-mail address of the transfer source wireless terminal device is input to identify the transfer source wireless terminal device. Note that input to the telephone number input space 511 and e-mail address input space 512 is performed by operation input at the operating unit 360.

The OK button 513 is a button pressed after input operations to the telephone number input space 511 or e-mail address input space 512 have been performed, to finalize the input.

Now, let us say that input operations to the telephone number input space 511 (600-222-xxxx) have been performed at the display screen 510 shown in (b) in FIG. 6, following which the OK button 513 has been performed (402). Thus, the terminal identification information of the wireless terminal device serving as the transfer source (transfer requestee) for transfer of the USIM information usage right is input (402). In this case, a USIM information transfer request including the input terminal identification information is transmitted from the first wireless terminal device 300 to the authentication control unit 210 of the network control device 200 (403, 404). Note that this USIM information transfer request includes the terminal identification information of the transfer requester (transfer destination) as well as the terminal identification information of the transfer requestee (transfer source). Also, the USIM information transfer request is transmitted from the first wireless terminal device 300 to the authentication control unit 210 of the network control device 200 by the limited connection described above.

Upon the authentication control unit 210 receiving the USIM information transfer request (404), following confirmation of the contents of the wireless terminal device management database 220, the USIM information transfer request is transmitted to the wireless terminal device identified by the terminal identification information included in the received USIM information transfer request (405). In this example, the USIM information transfer request is transmitted to the second wireless terminal device 400 corresponding to the terminal identification information (600-222-xxxx) (405). Now, in the event that the USIM information transfer request has been received, the authentication control unit 210 makes confirmation using the wireless terminal device management database 220 regarding whether or not the wireless terminal device identified by the terminal identification information included in the USIM information transfer request holds valid USIM information. Also, the authentication control unit 210 obtains information (telephone number, e-mail address, etc.) relating to the transfer destination (first wireless terminal device 300) displayed at the transfer source (second wireless terminal device 400) from the wireless terminal device management database 220. The authentication control unit 210 then transmits the USIM information transfer request including the information relating to the transfer destination (first wireless terminal device 300) that has been obtained (405).

Upon the second wireless terminal device 400 receiving the USIM information transfer request (406), a display screen for causing the user to confirm the transfer of the USIM information usage right is displayed on the display unit 370 of the second wireless terminal device 400 (407).

Shown in (a) in FIG. 7 is an example of a display screen (display screen 520) for causing the user to confirm the transfer of the USIM information usage right. The display screen 520 is a display screen for displaying information to identify the transfer destination wireless terminal device to which the USIM information usage right is to be transferred, so that the user can confirm the USIM information transfer. Specifically, the display screen 520 includes a telephone number display space 521, an e-mail address display space 522, accept button 523, and decline button 524.

The telephone number display space 521 is a region for displaying the telephone number of the transfer destination wireless terminal device as terminal identification information of the wireless terminal device serving as the transfer destination to which the USIM information usage right is to be transferred. The e-mail address display space 522 is a region for displaying the e-mail address of the transfer destination wireless terminal device as terminal identification information of the wireless terminal device serving as the transfer destination to which to transfer the USIM information usage right.

With this example, an example is illustrated where the telephone number and e-mail address of the transfer destination wireless terminal device are displayed at the same time, to notify the transfer destination wireless terminal device to the user. Note that other information (e.g., name of the owner) included in the USIM information transfer request transmitted from the authentication control unit 210 may be displayed on the display screen 520. Also, other information relating to the transfer destination wireless terminal device (e.g., name of the owner) may be displayed along with the telephone number and e-mail address, based on registration information (e.g., a contact list) held in the second wireless terminal device 400, for example.

The accept button 523 is a button pressed when the user has confirmed transferring of the USIM information usage right to the wireless terminal device of which the terminal identification information is displayed at the telephone number display space 521 and e-mail address display space 522. The decline button 524 is a button pressed when the user does not consent to transferring of the USIM information usage right to the wireless terminal device of which the terminal identification information is displayed at the telephone number display space 521 and e-mail address display space 522.

Now, let us say that the accept button 523 has been pressed in the display screen 520 in (a) in FIG. 7 (407). In the event that the accept button 523 has been pressed after transfer confirmation of the USIM information usage right in this manner (407), a display screen for inputting a password used at the time of transferring the USIM information usage right is displayed on the display unit 370 of the second wireless terminal device 400 (408).

Shown in (b) in FIG. 7 is an example of a display screen (display screen 530) for inputting the password. The display screen 530 is a display screen for inputting the password used for transferring the USIM information usage right. Specifically, the display screen 530 includes a password input space 531, an OK button 532, and a return button 533.

The password input space 531 is a region for inputting a password used for transferring the USIM information usage right. The OK button 532 is a button pressed after the input operations to the password input space 531 to finalize the input thereof.

Now, let us say that a password "123abc" (shown in (b) in FIG. 7 as "****", since passwords are not displayed in actual screens due to security concerns), for example, has been input to the display screen 530 (408). In the event that a password has been input in this way (408), the control unit 330 of the second wireless terminal device 400 performs authentication processing of the input password (409). In the event that the input password has been authenticated (409), a USIM information transfer permission (transfer information) permitting the transfer of the USIM information usage right is transmitted from the second wireless terminal device 400 to the authentication control unit 210 of the network control device 200 (410, 411). Note that in the event that the input password is not authenticated (409**), a screen prompting the user to input the correct password is displayed.

Next, upon the authentication control unit 210 receiving the USIM information transfer permission (411), the authentication control unit 210 transmits USIM information invalidation information for invalidating the USIM information of the wireless terminal device which has transmitted the USIM information transfer permission to the second wireless terminal device 400 (412, 413). Upon receiving the USIM information invalidation information (413), the second wireless terminal device 400 performs invalidation processing of the USIM information stored in the USIM information storage unit 350 of the second wireless terminal device 400 (414). Accordingly, the USIM information held at the second wireless terminal device 400 is invalidated, and the second wireless terminal device 400 is no longer able to use the USIM information.

After the USIM information invalidation processing has ended (414), USIM information invalidation confirmation information to the effect that the USIM information invalidation processing has ended is transmitted from the second wireless terminal device 400 to the authentication control unit 210 of the network control device 200 (415, 416).

Upon receiving the USIM information invalidation confirmation information (416), the authentication control unit 210 transmits the USIM information validation information for validating the USIM information of the wireless terminal device which has transmitted the USIM information transfer request to the first wireless terminal device 300 (417, 418). Upon the first wireless terminal device 300 receiving the USIM information validation information (transfer information) (418), validation processing of the USIM information stored in the USIM information storage unit 350 of the first wireless terminal device 300 is performed (419). Accordingly, the USIM information held in the first wireless terminal device 300 is validated, and the first wireless terminal device 300 can use the USIM information.

After the USIM information validation processing has ended (419), USIM information validation confirmation information to the effect that the USIM information validation processing has ended is transmitted from the first wireless terminal device 300 to the authentication control unit 210 of the network control device 200 (420, 421). Upon receiving the USIM information validation confirmation information (421), the authentication control unit 210 rewrites the content of the wireless terminal device management database 220. That is to say, the content of the wireless terminal device management database 220 is rewritten such that the first wireless terminal device 300 is valid and the second wireless terminal device 400 is invalid.

Next, USIM information transfer end information to the effect that the transfer processing of the USIM information has ended is transmitted from the authentication control unit 210 of the network control device 200 to the second wireless terminal device 400 (422, 423). In the same way, USIM information transfer end information is transmitted from the authentication control unit 210 of the network control device 200 to the first wireless terminal device 300 (424, 425).

Thus, in the event that the USIM information transfer end information has been transmitted to the first wireless terminal device 300 and the second wireless terminal device 400, the authentication control unit 210 outputs the USIM information transfer end information to the billing processing unit 600. Also, the authentication control unit 210 outputs connection information relating to the authenticated wireless terminal device (e.g., connection services (calls, data communication), connection time) to the billing processing unit 600. Also, the billing processing unit 600 performs billing processing based on this information. Billing information will be described in detail with reference to FIGS. 11 through 16.

Note that while with this example, an example has been illustrated of transferring USIM information usage rights by validation/invalidation, USIM information usage rights may be transferred by transferring the USIM information itself. In this case, upon a USIM information transfer request being transmitted to the second wireless terminal device 400, the USIM information held in the second wireless terminal device 400 is invalidated (erased), and transfer information is transmitted from the second wireless terminal device 400 or the network control device 200. Valid USIM information is set by recording the USIM information included in this transfer information in the USIM information storage unit 350.

Also, while with this example, an example has been illustrated of making a USIM information transfer request from a wireless terminal device having no USIM information usage right, an arrangement may be made where a USIM information transfer request is made from a wireless terminal device having a USIM information usage right. The USIM information transfer request in this case is a request for transferring the USIM information to the other wireless terminal device. Also, in this case, various types of information relating to transfer processing can be transmitted to the other wireless terminal device not having the USIM information usage right, by limited connection.

Operation Example of Communication System

Figure 9:
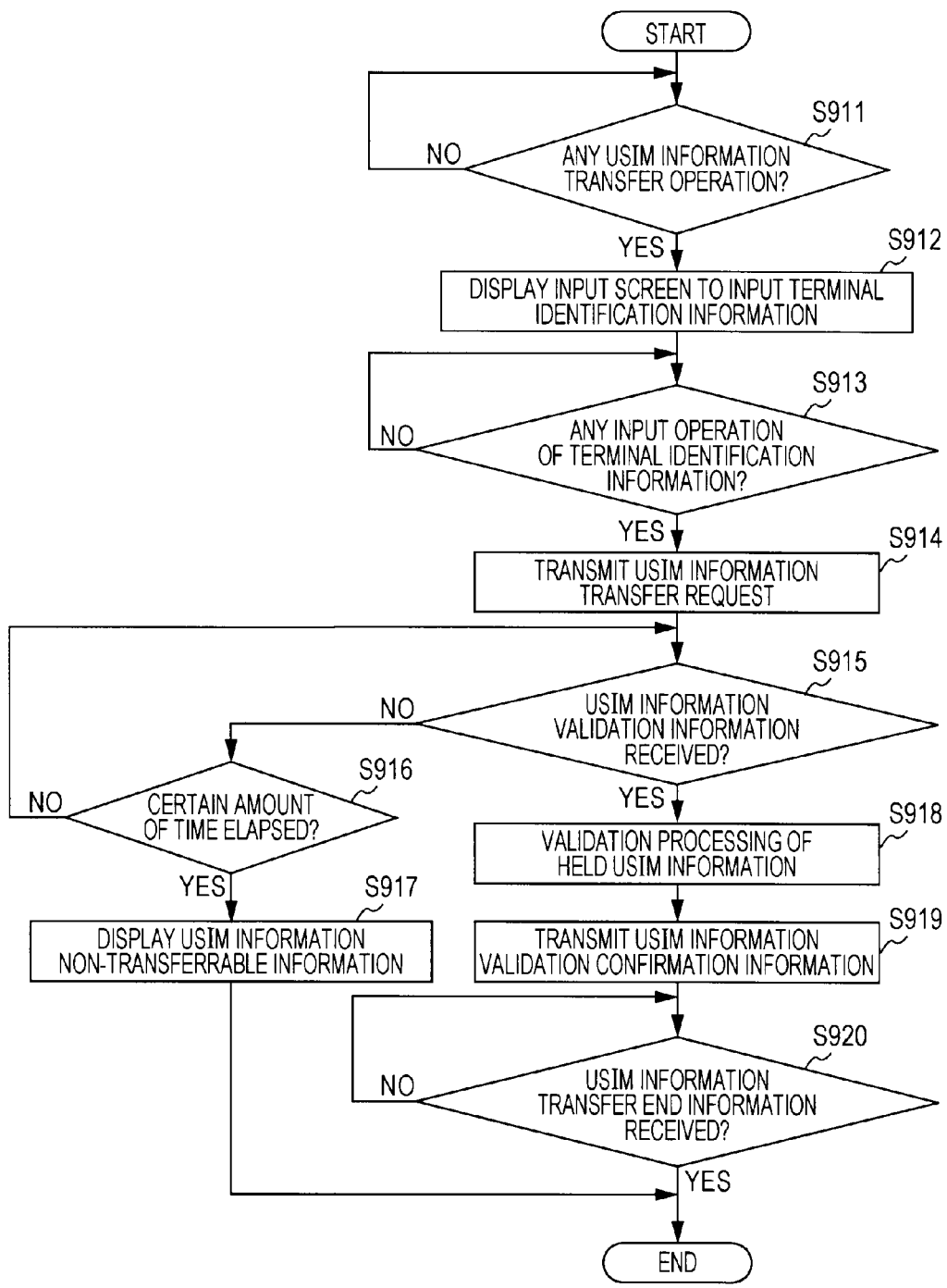
FIG. 9 is a flowchart illustrating an example of processing procedures for communication processing by the communication system according to the first embodiment.
Figure 10:
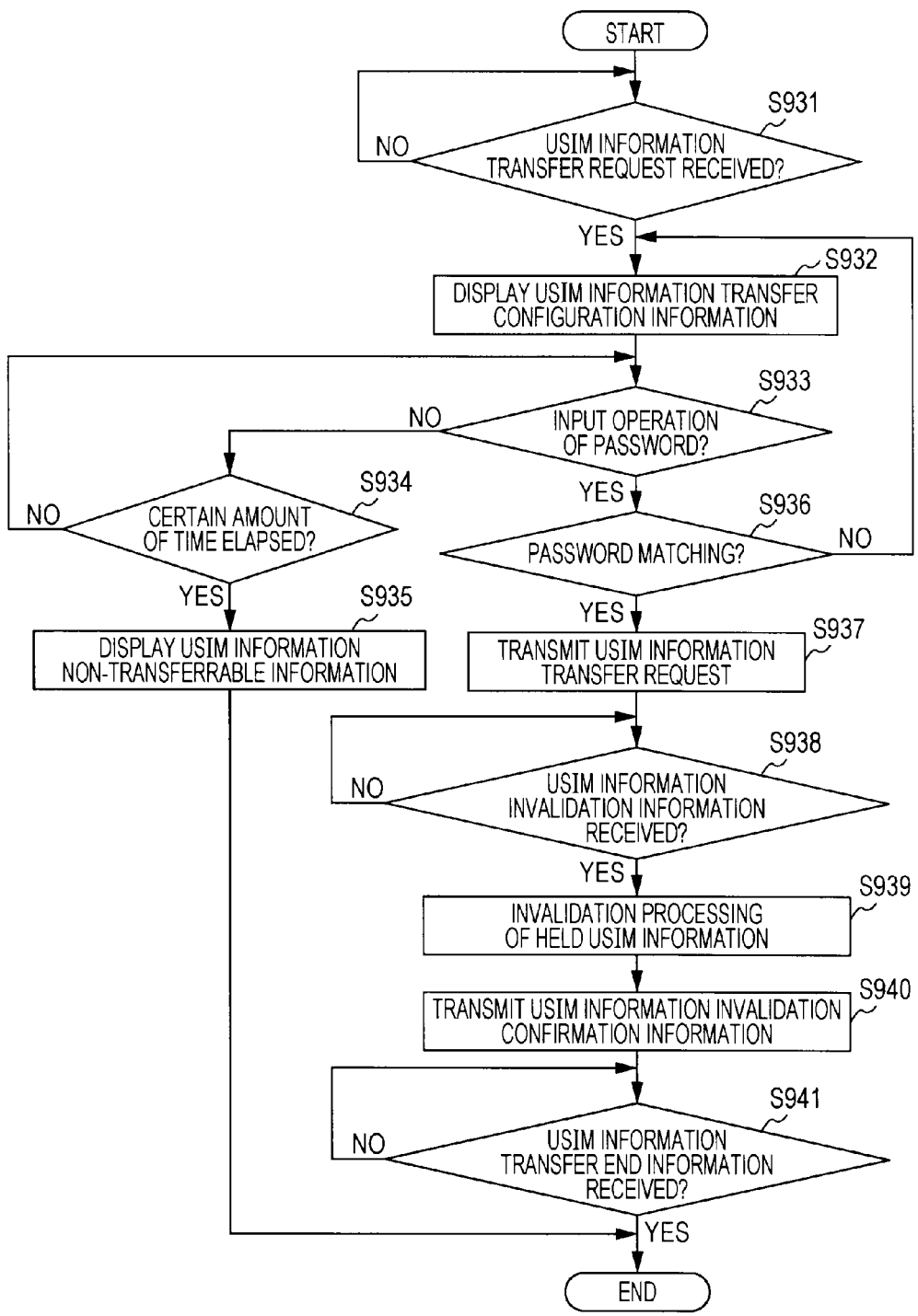
FIG. 10 is a flowchart illustrating an example of processing procedures for communication processing by the second wireless terminal device according to the first embodiment.

Next, the operations of the communication system 100 according to the first embodiment of the present disclosure will be described with reference to the drawings. In FIGS. 9 and 10, only an operation example between the first wireless terminal device 300 and second wireless terminal device 400 will be described, but the same can be applied for operations between other wireless terminal devices as well.

Operation Example of Wireless Terminal Device (Transfer Destination of USIM Information Usage Right)

FIG. 9 is a flowchart illustrating an example of processing procedures for communication processing by the first wireless terminal device 300 according to the first embodiment of the disclosure. In FIG. 9, an example is described regarding a case where the first wireless terminal device 300 is the transfer destination of the USIM information usage right. Also, in FIG. 9, an example is described regarding a case where both the first wireless terminal device 300 and second wireless terminal device 400 have USIM information, and the USIM information usage right is transferred by validation/invalidation by the authentication control unit 210 of the network control device 200.

First, determination is made regarding whether or not a USIM information transfer operation has been made (step S911), and in the event that no USIM information transfer operation has been made, monitoring is continued.

In the event that a USIM information transfer operation has been made (Yes in step S911), display is made on the display unit 370 of a display screen for input of terminal identification information of the transfer source (transfer requestee) from which the USIM information usage right is to be transferred (step S912).

Next, the control unit 330 makes determination regarding whether or not the terminal identification information of the wireless terminal device which is the transfer requestee has been input (step S913), and in the event that an input operation thereof has not been performed, monitoring is continued.

In the event that the terminal identification information of the wireless terminal device which is the transfer requestee has been input (Yes in step S913), the control unit 330 transmits a USIM information transfer request including the input terminal identification information to the authentication control unit 210 of the network control device 200 (step S914). This USIM information transfer request is performed by the above-described limited connection.

Next, the control unit 330 determines whether or not USIM information validation information for validating the USIM information stored in the USIM information storage unit 350 has been received (step S915). In the event that USIM information validation information has not been received (No in step S915), the control unit 330 determines whether or not a predetermined amount of time has elapsed since transmission of the USIM information transfer request (step S916). In the event that the predetermined amount of time has not elapsed since transmission of the USIM information transfer request (No in step S916), the flow returns to step S915. On the other hand, in the event that the predetermined amount of time has elapsed since transmission of the USIM information transfer request (Yes in step S916), the control unit 330 displays non-transferable information making notification to the effect that the USIM information usage right is not transferable, on the display unit 370 (step S917), and the communication processing operations end.

Also, in the event that USIM information validation information has been received (Yes in step S915), the control unit 330 performs validation processing of the USIM information stored in the USIM information storage unit 350 (step S918). Accordingly, the USIM information stored in the USIM information storage unit 350 is validated, and the first wireless terminal device 300 can use the USIM information.

Next, the control unit 330 transmits USIM information validation confirmation information to the effect that validation processing of the USIM information has been completed, to the authentication control unit 210 of the network control device 200 (step S919). Next, the control unit 330 determines whether or not USIM information transfer end information to the effect that the USIM information transfer processing has ended, has been received (step S920), and in the event that USIM information transfer end information has not been received, continues monitoring. In the event that USIM information transfer end information has been received (Yes in step S920), the communication processing operations end.

Operation Example of Wireless Terminal Device (Transfer Source of USIM Information Usage Right)

FIG. 10 is a flowchart illustrating an example of processing procedures for communication processing by the second wireless terminal device 400 according to the first embodiment of the disclosure. In FIG. 10, an example is described regarding a case where the second wireless terminal device 400 is the transfer source of the USIM information usage right. Also, in FIG. 10, an example is described regarding a case where both the first wireless terminal device 300 and second wireless terminal device 400 have USIM information, and the USIM information usage right is transferred by validation/invalidation by the authentication control unit 210 of the network control device 200.

First, determination is made regarding whether or not the control unit 330 has received a USIM information transfer operation (step S931), and in the event that no USIM information transfer operation has been received, monitoring is continued.

In the event that a USIM information transfer operation has been received (Yes in step S931), display is made on the display unit 370 of a display screen for the user to confirm transfer of the USIM information usage right (step S932). Also, after confirmation of transfer with this display screen, the control unit 330 displays on the display unit 370 a display screen (password input screen) for input of a password used for transferring the USIM information usage right (step S932).

Next, the control unit 330 determines whether or not a password input operation has been performed at the password input screen (step S933). In the event that no password input operation has been performed (No in step S933), the control unit 330 determines whether or not a predetermined amount of time has elapsed since the password input screen has been displayed (step S934). In the event that determination is made that the predetermined amount of time has not elapsed since the password input screen has been displayed (No in step S934), the flow returns to step S933. On the other hand, in the event that the predetermined amount of time has elapsed since the password input screen has been displayed (Yes in step S934), the control unit 330 transmits non-transferable information to the authentication control unit 210 for notifying that the USIM information usage right is not transferable (step S935), and the communication processing operations end.

Also, in the event that a password input operation has been performed (Yes in step S933), the control unit 330 determines whether or not the input password matches the registered password (step S936). That is to say, password authentication is performed. In the event that the input password does not match the registered password (No in step S936), the flow returns to step S932, and the control unit 330 displays a display screen prompting the user to input the correct password.

On the other hand, in the event that the input password does matches the registered password (Yes in step S936), the control unit 330 transmits USIM information transfer permission permitting transfer or the USIM information usage right to the authentication control unit 210 (step S937).

Next, the control unit 330 determines whether or not USIM information invalidation information for invalidating the USIM information stored in the USIM information storage unit 350 has been received (step S938), and in the event that USIM information invalidation information has not been received, monitoring is continued.

On the other hand, in the event that USIM information invalidation information has been received (Yes in step S938), the control unit 330 performs invalidation processing of the USIM information stored in the USIM information storage unit 350 (step S939). Accordingly, the USIM information stored in the USIM information storage unit 350 is invalidated, and the second wireless terminal device 400 is not able to use the USIM information.

Next, the control unit 330 transmits USIM information invalidation confirmation information to the effect that the USIM information invalidation processing has ended, to the authentication control unit 210 of the network control device 200 (step S940). Next, the control unit 330 determines whether or not USIM information transfer end information to the effect that the USIM information transfer processing has ended, has been received (step S941), and in the event that no USIM information transfer end information has been received, monitoring is continued. In the event that USIM information transfer end information has been received (Yes in step S941), the communication processing operations end.

As described above, with the first embodiment of the present disclosure, transfer processing of valid USIM information (subscription authentication information) can be easily performed among multiple wireless terminal devices, with simple user operations. Accordingly, even in a case where an individual own multiple wireless terminal devices, the multiple wireless terminal devices can be easily used without multiple wireless connection service subscriptions. Also, UICC cards do not have to be reattached among wireless terminal devices even in the case of using multiple wireless terminal devices. Accordingly, USIM information (subscription authentication information) can be shared among multiple wireless terminal devices.

Now, since the wireless terminal devices are different devices as described above, the functions (communication functions, etc.) which each wireless terminal device has are different. Accordingly, in the event that USIM information is transferred, it is important to calculate communication fees and the like which are appropriate in accordance to the transfer destination wireless terminal device. Also, it is important to appropriately bill for fees relating to such transfer processing. Accordingly, billing processing at the communication system 100 will now be described.

Functional Configuration Example of Billing Processing Unit

Figure 11:
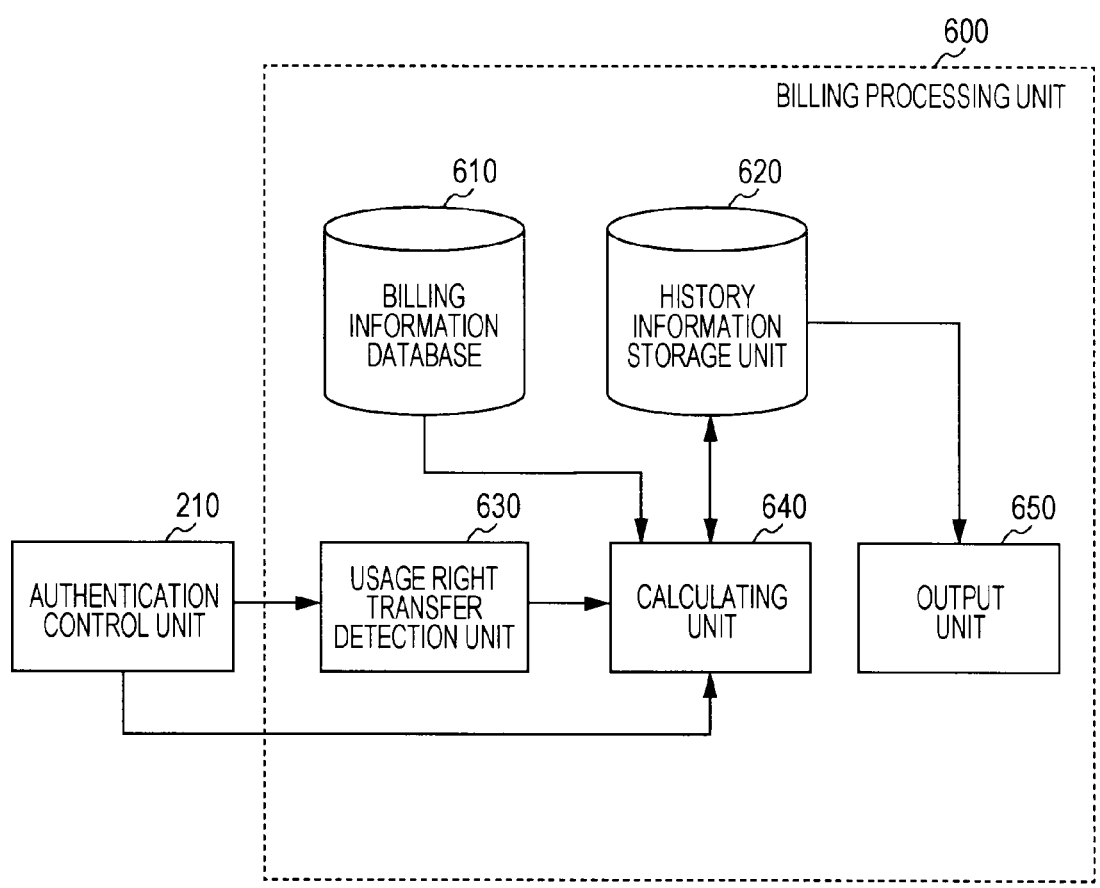
FIG. 11 is a block diagram illustrating a functional configuration example of a billing processing unit according to the first embodiment.

Next, the billing processing unit 600 of the network control device 200 will be described in detail with reference to drawings. FIG. 11 is a block diagram illustrating a functional configuration example of the billing processing unit 600 according to the first embodiment of the present disclosure. Note that in FIG. 11, the authentication control unit 210 shown in FIG. 2 is shown along with the billing processing unit 600.

The billing processing unit 600 includes a billing information database 610, a history information storage unit 620, a usage right transfer detection unit 630, a calculating unit 640, and an output unit 650.

The billing information database 610 is a database storing billing information relating to each wireless terminal device, and supplies the stored billing information to the calculating unit 640. The contents of the billing information database 610 will be described later in detail with reference to FIG. 12B.

The history information storage unit 620 stores history information including history of transfer of USIM information usage rights and information of usage of USIM information (e.g., the information shown in (a) through (c) in FIG. 13), and supplies the stored history information to the calculating unit 640.

The usage right transfer detection unit 630 is for detecting transfer of USIM information usage rights among the wireless terminal devices, based on the USIM information transfer end information from the authentication control unit 210, and outputs detection results (transfer detection information)

to the calculating unit 640. The usage right transfer detection unit 630 is an example of a detecting unit referred to in the Summary.

The calculating unit 640 uses the connection information from the authentication control unit 210, the billing information stored in the billing information database 610, and the history information stored in the history information storage unit 620, to calculate the fees relating to the USIM information (fees and the like relating to the wireless terminal device). Now, the calculating unit 640 calculates fees relating to the USIM information using, of the billing information stored in the billing information database 610, the billing information relating to the wireless terminal device to which the USIM information usage right has been transferred. That is to say, in the event that the transfer of the USIM information usage right has already been detected by the usage right transfer detection unit 630, the calculating unit 640 calculates the fees relating to the USIM information occurring after that transfer, based on the billing information set for the wireless terminal device to which the usage right has been transferred.

Also, the calculating unit 640 calculates fees relating to the USIM information using the history information stored in the history information storage unit 620 (history of transfer of the USIM information usage right detected by the usage right transfer detection unit 630, and history of usage of the USIM information). Now, the history of usage of the USIM information is history relating to usage of the USIM information with regard to each wireless terminal device to which the USIM information usage right has been transferred. For example, at least one of the content of the service which the wireless terminal devices can use, the communication time and communication of usage by the wireless terminal devices, and the capabilities relating to wireless communication which each wireless terminal device has, can be used as history of use of the USIM information. Also, history of transfer of the USIM information usage right is history including the number of times that the USIM information usage right has been transferred, the type of the wireless terminal devices to which the transfer has been made, and the contents of the services which the wireless terminal devices to which the transfer was made have used. The calculating unit 640 calculates fees relating to the USIM information using at least one history of transfer of the USIM information usage right.

The output unit 650 outputs the total monetary amount included in the history information stored in the history information storage unit 620 (total value of fees relating to USIM information). For example, in the event that a predetermined period has elapsed, the output unit 650 outputs the total monetary amount.

Example of Specifications of Wireless Terminal Device and Example of Contents of Billing Information Database FIGS. 12A and 12B are diagrams schematically illustrating an example of the specifications of the wireless terminal devices according to the first embodiment of the present disclosure, and a configuration example of the billing information database 610. FIG. 12A illustrates specification examples of the first wireless terminal device 300, second wireless terminal device 400, and third wireless terminal device 700. Also, FIG. 12B illustrates an example of the contents of the billing information database 610.

To simplify description, in FIG. 12A, only service capability 601 and data communication capability 602 are shown in a simplified manner as examples of the specifications of the first wireless terminal device 300, second wireless terminal device 400, and third wireless terminal device 700.

For the service capability 601, the functions which the relevant wireless terminal device has (at least one of call functions and data communication functions) are shown. We will say that the first wireless terminal device 300 has both call functions and data communication functions, and that the second wireless terminal device 400 and third wireless terminal device 700 have only data communication functions.

As for the data communication capability 602, the capabilities of the data communication functions which the relevant wireless terminal device has is illustrated in terms of increments of communication speed (Mbps (Megabits per second)). Note that with the first wireless terminal device 300 which has call functions, only the capabilities of data communication functions are shown.

The billing information database 610 shown in FIG. 12B stores, as billing information relating to the wireless terminal devices, wireless terminal device identification information 611, service capability 612, data communication capability 613, unit price 614, and unit 615. Also, the billing information database 610 stores, as billing information relating to the transfer of the USIM information usage right, the unit price 614 and unit price 615.

The wireless terminal device identification information 611 stores identification information for identifying the wireless terminal devices. Note that in FIG. 2B, only the names shown in FIGS. 1A through 2, and so on (first through third wireless terminal devices) are shown to facilitate description.

The service capability 612 stores the functions which the relevant wireless terminal device has (at least one of call functions and data communication functions). Note that the service capability 612 corresponds to the service capability 601 shown in FIG. 12A.

The data communication capability 613 stores in the capability of data communication functions which the relevant wireless terminal device has (shown in FIG. 12B in terms of increments of communication speed). Note that the data communication capability 613 corresponds to the data communication capability 602 shown in FIG. 12A. Also, the information in the service capability and data communication capability 613 can be stored by notification of the wireless terminal devices to the billing processing unit 600 at the time of transfer processing of the USIM information usage right of the wireless terminal devices. Also, these may be stored by the mobile network operator upon the wireless terminal devices obtaining the USIM information (i.e., when the user 10 enters into contract with the mobile network operator). Also, these may be stored by notification of the wireless terminal devices to the billing processing unit 600 at the time of the wireless terminal devices connecting to the mobile network operator to receive services via wireless line.

The unit price 614 stores the unit price for the communication fees for the corresponding function, as billing information relating to the wireless terminal devices. Also, the unit price 614 stores the unit price of fees relating to transfer of USIM information usage rights. Now, an arrangement may be set where the unit price (the packet fee itself) differs for a wireless terminal device capable of handling calls and packets, and a wireless terminal device dedicated to handle packets (e.g., the first wireless terminal device and second wireless terminal device), for example. That is to say, in the event that the functions to be handled are fewer, the functions used for communication are restricted, so the price can be set lower. Also, the unit price can be set lower as the communication capability increases (e.g., the second wireless terminal device and third wireless terminal device), for example. That is to say, the higher the communication capability is, the less time it takes for communication of one packet, so the price can be set lower accordingly.

The unit 615 stores a unit corresponding to the unit price 614, as billing information relating to the wireless terminal devices, or information relating to the transfer of the USIM information usage right.

Example of Transition of History Information

FIG. 13 is a diagram schematically illustrating the transition of fees relating to USIM information as calculated by the calculating unit 640 according to the first embodiment of the present disclosure. In FIG. 13, the transition of USIM information transfer history and USIM information usage history, services used, additional fees, and accumulated fees, will be illustrated as the transition of fees related to USIM information.

With the example shown in FIG. 13, description will proceed assuming a case of the USIM information usage right first being held at the first wireless terminal device 300, and then the USIM information usage right being sequentially transferred to the second wireless terminal device 400 and then to the third wireless terminal device 700. We will also say that the initial accumulated fee is ¢0.

Shown in (a) in FIG. 13 is a fee relating to USIM information calculated by the calculating unit 640, in a case that the USIM information usage right is held at the first wireless terminal device 300. We will say that, for example, in a case where the USIM information usage right is held at the first wireless terminal device 300, the user 10 of the first wireless terminal device 300 has placed a 10-minute call. In this case, the calculating unit 640 obtains the call time (the used service and the time thereof) from the authentication control unit 210, and also makes reference to the unit price 614 (shown in FIG. 12B) of the first wireless terminal device stored in the billing information database 610, so as to calculate the additional fee. That is to say, ¢50 (5 (unit price: ¢/minute)×10 (usage time: minutes)) is calculated as the addition fee. Also, ¢50 is calculated as the accumulated fee. Note that the used service and the time thereof can be obtained from requests transmitted from the wireless terminal device to receive the service, or service type information transmitted from the service provider.

Now, let us assume a case of the USIM information usage right being transferred from the first wireless terminal device 300 to the second wireless terminal device 400. In this case, the calculating unit 640 makes determination of this transfer based on the transfer detection information from the usage right transfer detection unit 630, and calculates the additional fee making reference to the unit 614 (shown in FIG. 12B) stored in the billing information database 610. That is to say, ¢10 (unit price: ¢/each time) is calculated as the additional fee, and ¢60 (50+10) is calculated as the accumulated fee. An example of addition at the time of transfer is shown in (b) in FIG. 13.

Shown in (b) in FIG. 13 is the fee relating to the USIM information calculated by the calculating unit 640 in the case that the USIM information usage right is held at the second wireless terminal device 400. For example, we will say that the user 10 who owns the second wireless terminal device 400 has performed data communication (100 packets worth of download of electronic books) while the USIM information usage right is held at the second wireless terminal device 400. In this case, the calculating unit 640 obtains the amount of packets relating to this data communication (packet amount) from the authentication control unit 210, and also calculates the additional fee by referencing the unit price 614 for the second wireless terminal device 400 (shown in FIG. 12B) stored in the billing information database 610. That is to say, ¢2 (0.02 (unit price: ¢/packet)×100 (packets used)) is calculated. Also, as described above, addition processing due to transfer is performed, so ¢62 (50+10+2) is calculated as the accumulated fee.

Next, let us assume a case of the USIM information usage right being transferred from the second wireless terminal device 400 to the third wireless terminal device 700. In this case as well, the additional fee (¢10 (unit price: ¢/each time)) is calculated, and ¢72 (62+10) is calculated as the accumulated fee. An example of addition at the time of transfer is shown in (c) in FIG. 13.

Shown in (c) in FIG. 13 is the fee relating to the USIM information calculated by the calculating unit 640 in the case that the USIM information usage right is held at the third wireless terminal device 700. For example, we will say that the user 10 who owns the third wireless terminal device 700 has performed data communication (1000 packets worth of download of music content) while the USIM information usage right is held at the third wireless terminal device 700. In this case, the calculating unit 640 obtains the amount of packets relating to this data communication (packet amount) from the authentication control unit 210, and also calculates the additional fee by referencing the unit price 614 for the third wireless terminal device 700 (shown in FIG. 12B) stored in the billing information database 610. That is to say, ¢10 (0.01 (unit price: ¢/packet)×1000 (packets used)) is calculated as the additional fee. Also, as described above, addition processing due to transfer is performed, so ¢82 (62+10+10) is calculated as the accumulated fee.

Thus, each time that transfer is performed, the additional fee is calculated by the calculating unit 640. Also, in the event that the wireless terminal device is used after transfer, the additional fee is calculated by the calculating unit 640 in accordance with that usage. The additional fees are sequentially added to the accumulated fee. Also, the additional fees and accumulated fee calculated in this way are sequentially stored in the history information storage unit 620 as history information (the information shown in (a) through (c) in FIG. 13).

Operation Example of Billing Processing Unit

Figure 14:
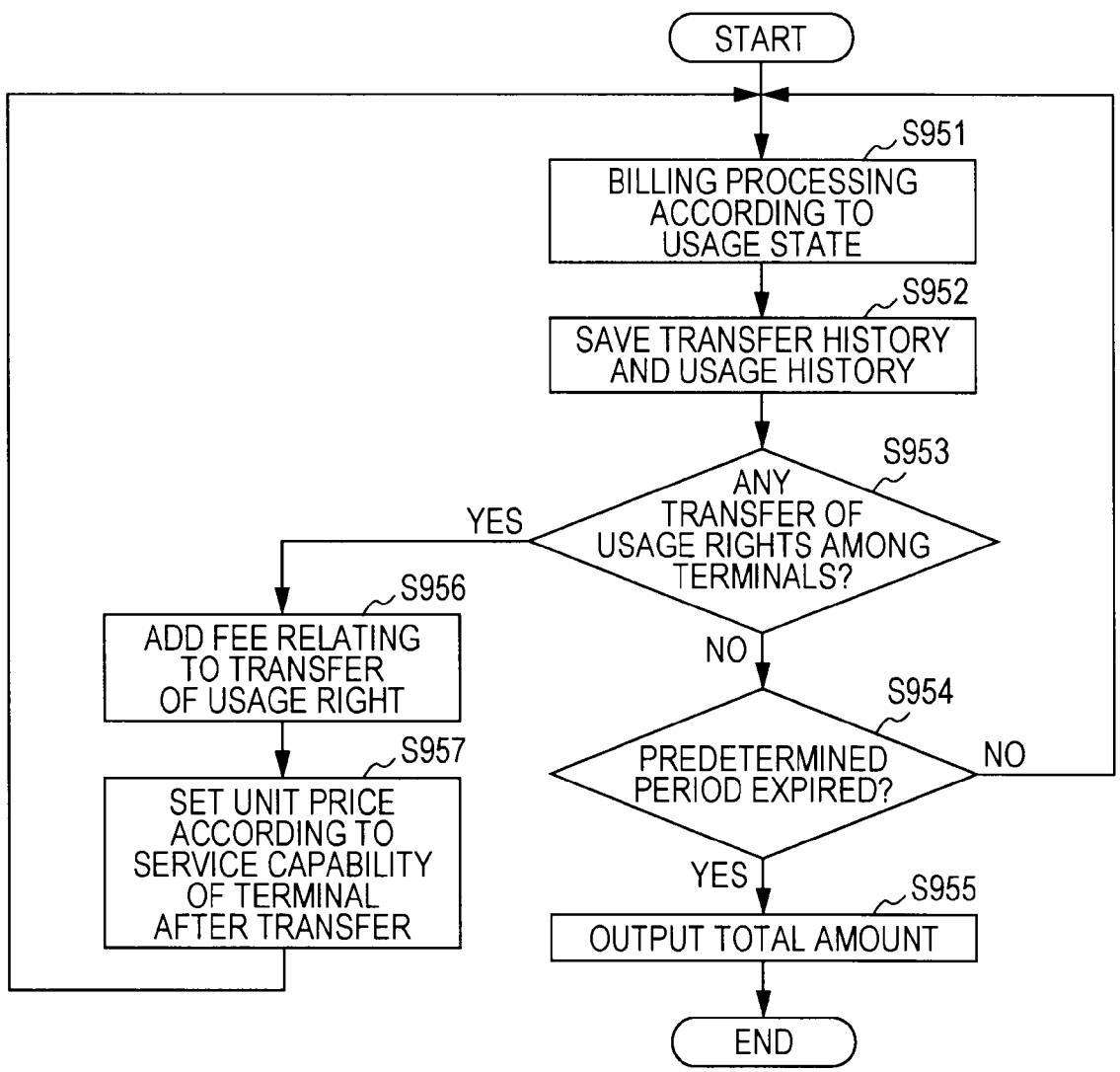
FIG. 14 is a flowchart illustrating an example of processing procedures for billing processing by a billing processing unit according to the first embodiment.

Next, the operations of the billing processing unit 600 according to the first embodiment of the present disclosure will be described with reference to drawings. FIG. 14 is a flowchart illustrating an example of the processing procedures for billing processing by the billing processing unit 600 according to the first embodiment of the present disclosure. FIG. 14 illustrates an example of a fixed amount (e.g., ¢10 shown in FIG. 12B) being added each time transfer of USIM information usage right is performed among the wireless terminal devices.

First, the calculating unit 640 performs billing processing relating to the wireless terminal device holding the USIM information usage right, based on the connection information from the authentication control unit 210 (step S951). That is to say, billing processing according to the usage state of the wireless terminal device holding the USIM information usage right is performed.

Next, the calculating unit 640 saves history information including the history of transfer of the USIM information usage right and the history of usage thereof, to the history information storage unit 620 (step S952).

Next, based on the transfer detection information from the usage right transfer detection unit 630, the calculating unit 640 determines whether or not the USIM information usage right has been transferred among the wireless terminal devices (step S953). In the event that the USIM information usage right has not been transferred (No in step S953), determination is made regarding whether or not a predetermined period has expired (step S954).

In the event that the predetermined period has expired (Yes in step S954), the total monetary amount included in the history information stored in the history information storage unit 620 (the total value of fees relating to the USIM information) is output from the output unit 650 (step S955). In the other hand, in the event that the predetermined period has not expired (No in step S954), the flow returns to step S951.

On the other hand, in the event that the USIM information usage right has been transferred (Yes in step S953), the calculating unit 640 adds the fee (¢10) relating to transfer of the USIM information usage right (step S956).

Next, the calculating unit 640 sets the unit price according to the wireless terminal device after transfer (unit price according to service capability, data communication functions, for example) as the unit price to be used for performing billing processing (step S957). This unit price (the unit price 614 shown in FIG. 12B) is obtained from the billing information database 610. Note that step S953 is an example of detection referred to in the Summary. Also, steps S957 and S951 are examples of calculating referred to in the Summary.

Note that in FIG. 14, an example has been described where a fixed price is added each time the USIM information usage right is transferred. Now, an arrangement may be conceived wherein, instead of a fixed price being added each time the USIM information usage right is transferred, a fixed price is charged regardless of the number of times of transfer of the USIM information usage right. Also, an arrangement may be conceived wherein an upper limit value is set for the number of times of transfer of the USIM information usage right, with addition being performed in accordance of the number of times of transfer if the upper limit is not reached, and once the upper limit is reached a fixed price is charged. Also, an arrangement may be conceived wherein an upper limit value and lower limit value are set for the number of times of transfer of the USIM information usage right, with a fixed price (e.g., Xmin) being charged if below the lower limit value, and a different fixed price (e.g., Xmax) being charged once the upper limit value is reached. In this case, addition corresponding to the number of times of transfer is performed between the lower limit and upper limit. These examples (examples other than the addition example of adding a fixed price for each transfer of the USIM information usage right) will be described with reference to FIGS. 15A through 16.

Example of Billing Fee Relating to Transfer of USIM Information

Figures 15A, 15B:
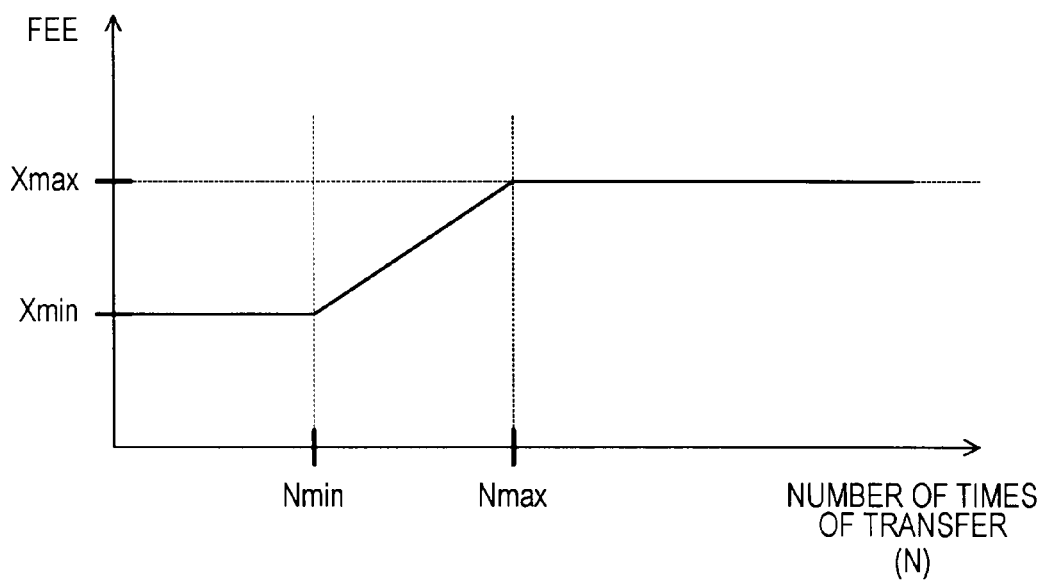
FIGS. 15A and 15B are simplified diagrams illustrating an example of added fees in the billing processing by the billing processing unit according to the first embodiment.

FIGS. 15A and 15B are simplified diagrams illustrating an example of additional fees for billing processing by the billing processing unit 600 according to the first embodiment of the present disclosure. FIG. 15A is a table illustrating an example of the relation between the number of times of transfer of the USIM information usage right and additional fees relating to the transfers. FIG. 15B shows the relation example in FIG. 15A in the form of a graph.

In FIGS. 15A and 15B, we will say that Nmin and Nmax are integers (where $0 \leq Nmin \leq Nmax$). Also, we will say that Xmin and Xmax are integers (where $0 \leq Xmin \leq Xmax$). X(N) is a fee added each time the USIM information usage right is transferred, and may be a fixed value, or may be a variable which increases or decreases in accordance with increase of N. Adjusting these values (Nmin, Nmax, Xmin, Xmax, X(N)) enables flat billing and billing according to the number of times of transfer. An arrangement may be made for billing according to the number of times of transfer where a fixed price is introduced once the number of times of transfer reaches the upper limit. Also, an arrangement may be made for billing according to the number of times of transfer where a fixed price is charged if below the lower limit value, and a fixed price (which is greater than the fixed price of the case of below the lower limit value) being charged once the upper limit value is reached. The example shown in FIGS. 15A and 15B will be described with reference to FIG. 16.

Operation Example of Billing Processing Unit

Figure 16:
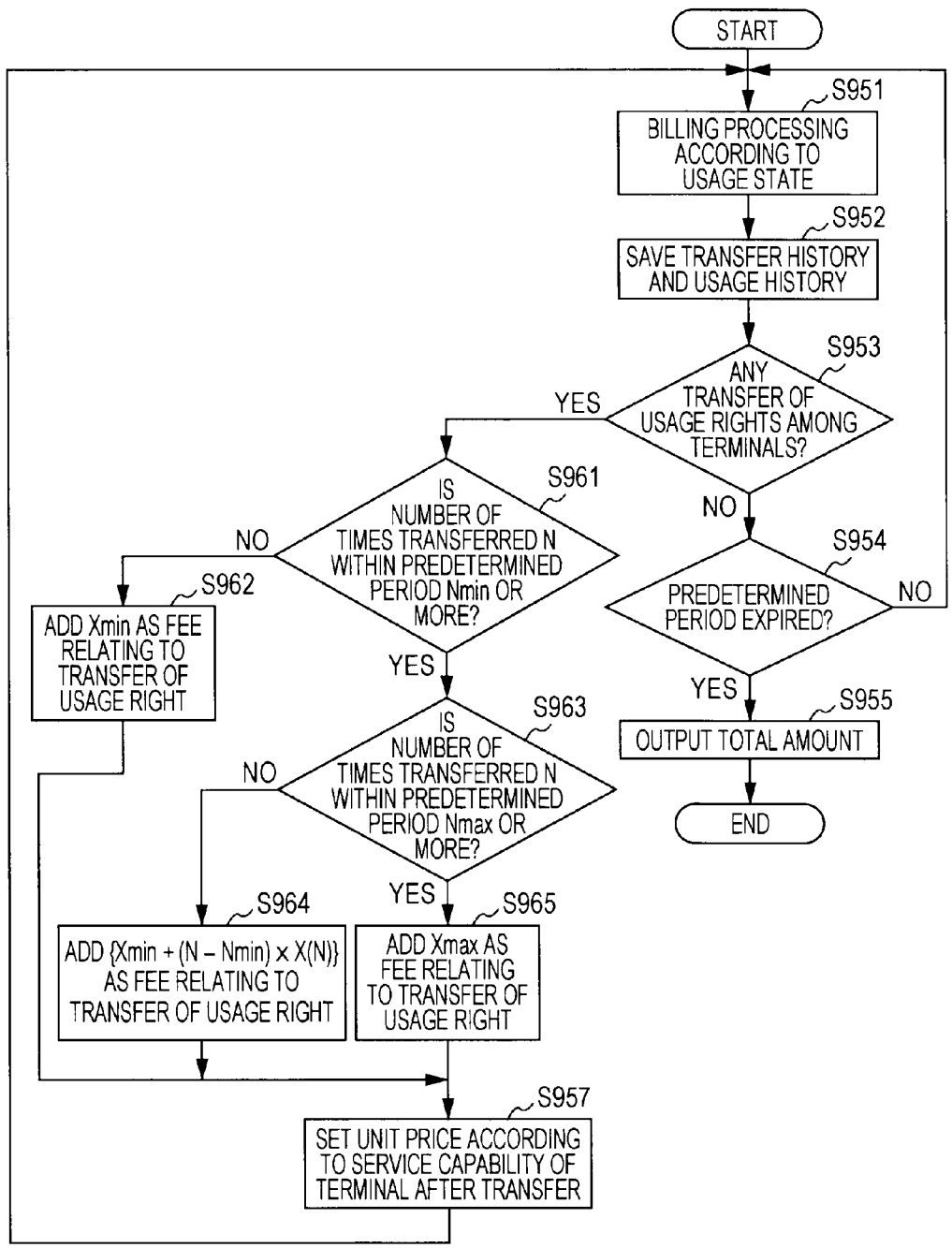
FIG. 16 is a flowchart illustrating an example of processing procedures for billing processing by the billing processing unit according to the first embodiment.

FIG. 16 is a flowchart illustrating an example of processing procedures for billing processing by the billing processing unit 600 according to the first embodiment of the present disclosure. The flowchart shown in FIG. 16 is a modification of that in FIG. 14, so portions which are the same as with FIG. 14 will be denoted with the same step Nos. and description thereof will be omitted as appropriate.

In the event that the USIM information usage right has been transferred (Yes in step S953), the calculating unit 640 determines whether or not the number of times of transfer N within a predetermined period (e.g., one month) is Nmin or greater (step S961). In the event that the number of times of transfer N within the predetermined period is not Nmin or greater (No in step S961), the calculating unit 640 adds Xmin as the fee relating to transfer of the USIM information usage right (step S962), and the flow proceeds to step S957.

On the other hand, in the event that the number of times of transfer N within the predetermined period is Nmin or greater (Yes in step S961), the calculating unit 640 determines whether or not the number of times of transfer N within the predetermined period is Nmax or greater (step S963). In the event that the number of times of transfer N within the predetermined period is not Nmax or greater (No in step S963), the calculating unit 640 adds $\{Xmin+(N-Nmin) \times X(N)\}$ as the fee relating to transfer of the USIM information usage right (step S964), and the flow proceeds to step S957. On the other hand, in the event that the number of times of transfer N within the predetermined period is Nmax or greater (Yes in step S963), the calculating unit 640 adds Xmax as the fee relating to transfer of the USIM information usage right (step S965), and the flow proceeds to step S957.

Accordingly, the calculating unit 640 can calculate fees relating to the USIM information using the upper limit value (Xmax) and lower limit value (Xmin) identified by the number of times which the usage right has been transferred, as transfer history of the USIM information usage right.

Now, let us assume a case where the USIM information usage right is transferred from a cellular telephone device capable of both telephone calls and data communication, to a data communication device for a particular purpose (e.g., an electronic book reader capable of downloading only electronic books), for example. In this case, the usage unit price is preferably changed for the cellular telephone device used for general purposes, and the data communication device used for a particular use only. Also, a wireless terminal device capable of only providing packet services of a maximum transmission speed of 1 Mbps and a wireless terminal device capable of providing packet services of a maximum transmission speed of 100 Mbps, for example, will differ in the amount of information which can be transmitted in the same amount of time. The usage unit price is preferably changed for such cases as well. According to the first embodiment of the present disclosure, appropriate billing processing can be performed according to functions which differ among the multiple wireless terminal devices sharing the USIM information (subscription authentication information).

Also, according to the first embodiment of the present disclosure, fees relating to transfer processing among the multiple wireless terminal devices sharing the USIM information (subscription authentication information) can be suitably calculated. That is to say, according to the first embodiment of the present disclosure, fees relating to the USIM information (subscription authentication information) shared among the multiple wireless terminal devices can be suitably calculated.

2. Second Embodiment

With the first embodiment of the present disclosure, an example has been illustrated where each time a USIM information usage right is transferred, fees relating to the transfer are added, and billing processing is performed according to the usage state at the wireless terminal device to which transfer has been made. Now, in the event that the transfer destination wireless terminal device is a product of a particular company, or in the event that the transfer source or transfer destination wireless terminal device uses services of a certain amount or more, an arrangement may be conceived wherein the fees relating to the transfer are alleviated to give the user preferential treatment. Accordingly, with the second embodiment of the present disclosure, an example is illustrated where the fees relating to the transfer are alleviated to give the user preferential treatment in the event that certain conditions are satisfied. Note that the configuration of the communication system according to the second embodiment of the present disclosure is generally the same as the example shown in FIGS. 1A and 1B and other drawings. Accordingly, portions thereof which are common with the first embodiment of the present disclosure will be denoted with the same reference numerals, and description thereof will be omitted as appropriate.

Example of Specifications of Wireless Terminal Device and Example of Contents of Billing Information Database FIGS. 17A and 17B are diagrams schematically illustrating an example of the specifications of the wireless terminal devices according to the second embodiment of the present disclosure, and a configuration example of the billing information database 800. The example shown in FIG. 17 is a partial modification of that in FIG. 12, so portions which are common with the FIGS. 12A and 12B will be denoted with the same reference numerals, and description thereof will be omitted as appropriate. Also, the example shown in FIGS. 17A and 17B will be described with regard to a case where models (wireless terminal devices) which are the object of discount are set beforehand at the mobile network operator.

FIG. 17A illustrates specification examples of the first wireless terminal device 300, second wireless terminal device 400, and third wireless terminal device 700. Also, FIG. 17B illustrates an example of the contents of the billing information database 800.

FIG. 17A shows, in addition to the service capability 601 and data communication capability 602 shown in 12A, applicability of discounted fee 603. The applicability of discounted fee 603 indicates whether the relevant wireless terminal device is applicable for discounted fees. That is to say, the applicability of discounted fee 603 indicates whether the relevant wireless terminal device corresponds to models which are the object of discount are set beforehand by the mobile network operator. FIG. 17A shows an example where the first wireless terminal device 300 is not applicable for discounted fees (indicated here by "N/A") and the second wireless terminal device 400 and third wireless terminal device 700 are applicable for discounted fees (indicated here by a checkmark "√").

The billing information database 800 shown in 17B stores, as billing information relating to the wireless terminal devices, wireless terminal device identification information 611, service capability 612, data communication capability 613, unit price 614, unit 615, and applicability of discounted fee 616. The applicability of discounted fee 616 stores information indicating whether or not the relevant wireless terminal device is applicable for discounted fees. FIG. 17B schematically illustrates these using "N/A" and "√" to facilitate description.

With the example shown in FIG. 17B, a case is shown where the unit price is ½ (i.e., 50% discount) for wireless terminal devices regarding which the discounted fees are applied. Specifically, in comparison with the example shown in FIG. 12B, the unit price 614 for the second wireless terminal device and third wireless terminal device is ½, due to application of the discounted fees (see FIG. 18 of a specific application example of discounted fees).

Example of Transition of History Information

FIG. 18 is a diagram schematically illustrating transition of fees relating to the USIM information calculated by the calculating unit 640 according to the second embodiment of the present disclosure. The example shown in FIG. 18 is a partial modification of that in FIG. 13, so description of portions in common with FIG. 13 will be omitted as appropriate. Also, the example shown in FIG. 18 will be described with reference to a case where models (wireless terminal devices) which are the object of discount are set beforehand at the mobile network operator.

Shown in (a) in FIG. 18 is a fee relating to USIM information calculated by the calculating unit 640, in a case that the USIM information usage right is held at the first wireless terminal device 300. Note that as shown in FIGS. 17A and 17B, the first wireless terminal device 300 is not applicable for the discounted fee, and accordingly, the history information shown in (a) in FIG. 18 is the same as that shown in (a) in FIG. 13.

Shown in (b) in FIG. 18 is the fee relating to the USIM information calculated by the calculating unit 640 in the case that the USIM information usage right is held at the second wireless terminal device 400. Now, as shown in FIGS. 17A and 17B, the second wireless terminal device 400 is applicable for the discounted fee. Accordingly, the history information shown in (b) in FIG. 18 is ½ that shown in (b) in FIG. 13 with regard to the additional fee (i.e., ¢1 (0.02 (unit price: ¢/packet)×100 (packets used)×½).

Shown in (c) in FIG. 18 is the fee relating to the USIM information calculated by the calculating unit 640 in the case that the USIM information usage right is held at the third wireless terminal device 700. Now, as shown in FIGS. 17A and 17B, the third wireless terminal device 700 is also applicable for the discounted fee. Accordingly, the history information shown in (c) in FIG. 18 is ½ that shown in (c) in FIG. 13 with regard to the additional fee (i.e., ¢5 (0.01 (unit price: ¢/packet)×1000 (packets used)×½).

The calculating unit 640 thus calculates additional fees for the wireless terminal devices which are applicable for discounted fees, according to the discount. Note that while FIGS. 17A through 18 illustrate an example of a discount of ½, other discounts may be used as well. Also, discounts may be varied as appropriate in accordance with usage states and so forth.

Example of Billing Fees According to Transfer Source or Transfer Destination

Next, an example will be described where the fee relating to transfer of the USIM information usage right is changed depending on whether the transfer source or transfer destination wireless terminal device is a product of a particular company. FIG. 19 is a simplified diagram illustrating an example of additional fees for billing processing with the billing processing unit 600 according to the second embodiment of the present disclosure. In the example shown in FIG. 19, X1 through X3 are positive values (where $0 \leq X1 \leq X2 \leq X3$). Note that X1 and X2 are fees to which discounts are applicable, and X3 is a fee to which discount is inapplicable. The example shown in FIG. 19 will be described with reference to FIG. 20.

Example of Operations of Billing Processing Unit

Figure 20:
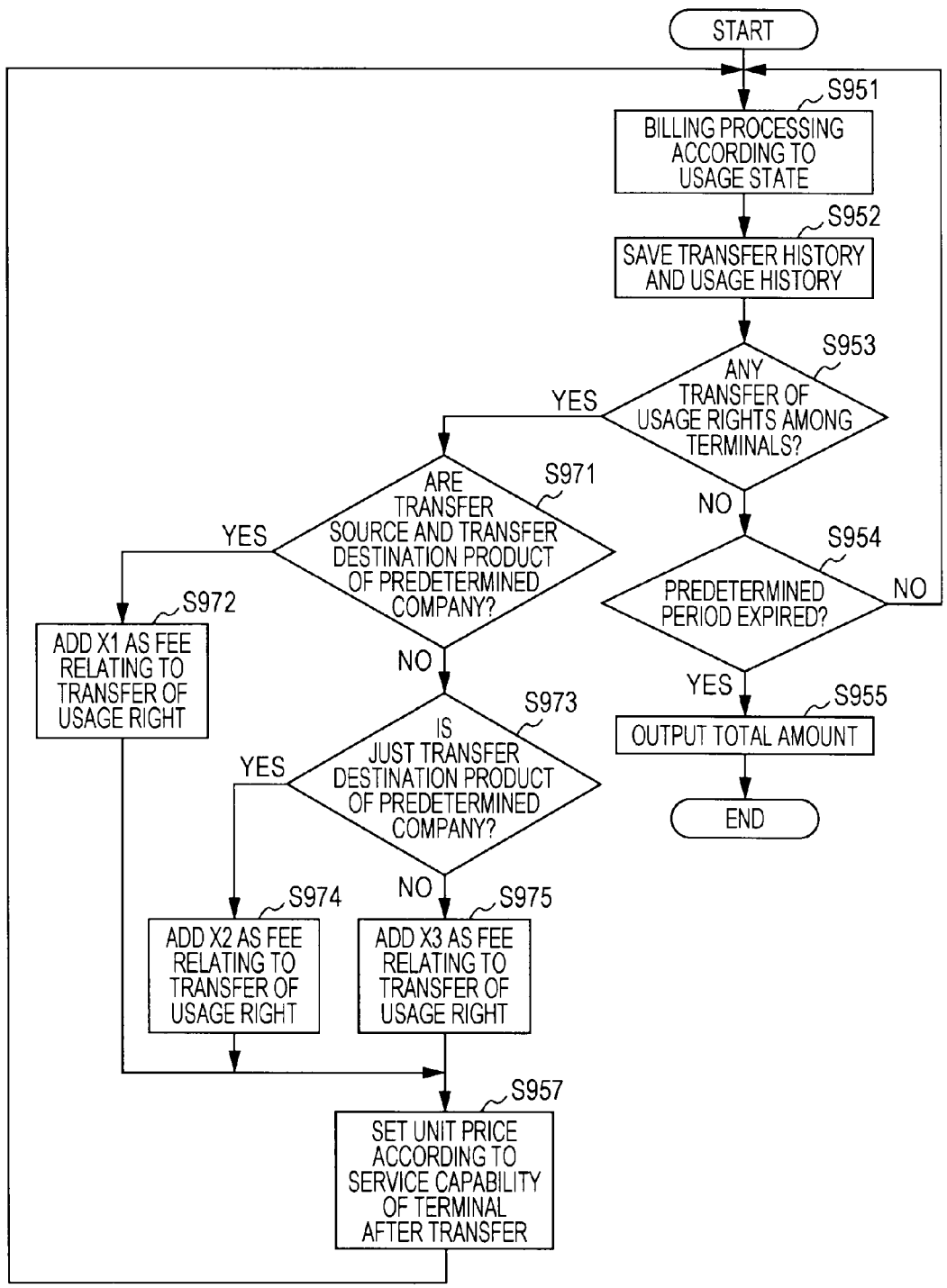
FIG. 20 is a flowchart illustrating an example of processing procedures for billing processing by the billing processing unit according to the second embodiment.

FIG. 20 is a flowchart illustrating an example of processing procedures for billing processing by the billing processing unit 600 according to the second embodiment of the present disclosure. Note that the flowchart shown in FIG. 20 is a modification of that in FIG. 14, so portions which are the same as with FIG. 14 will be denoted with the same step Nos. and description thereof will be omitted as appropriate.

In the event that the USIM information usage right has been transferred (Yes in step S953), the calculating unit 640 determines whether or not the transfer source and transfer destination wireless terminal devices are products of a predetermined company (e.g., manufactured by Company S) (step S971). In the event that the transfer source and transfer destination wireless terminal devices are products of the predetermined company (Yes in step S971), the calculating unit 640 adds X1 as the fee relating to transfer of the USIM information usage right (step S972), and the flow advances to step S957.

On the other hand, in the event that at least one of the transfer source and transfer destination wireless terminal devices is not a product of the predetermined company (No in step S971), the calculating unit 640 determines whether or not the transfer destination wireless terminal device is a product of the predetermined company (step S973). In the event that the transfer destination wireless terminal device is a product of the predetermined company (Yes in step S973), the calculating unit 640 adds X2 as the fee relating to transfer of the USIM information usage right (step S974), and the flow advances to step S957. Also, in the event that the transfer destination wireless terminal device is not a product of the predetermined company (No in step S973), the calculating unit 640 adds X3 as the fee relating to transfer of the USIM information usage right (step S975), and the flow advances to step S957.

Note that while an example has been illustrated here regarding a case where no discount is made in the event that the transfer source wireless terminal device alone is a product of a predetermined company, an arrangement may be made where discounts are applicable even in the event that the transfer source wireless terminal device is a product of a predetermined company. That is to say, the calculating unit 640 can calculate fees relating to USIM information using information indicating whether or not one of the transfer source and transfer destination wireless terminal devices regarding which transfer of USIM information usage right has been performed is a wireless terminal device of a particular type. Note that the wireless terminal device of the particular type may be, as described above, a product of a predetermined company (e.g., a product of one particular company, or one company out of multiple particular companies). Also, the wireless terminal device of a particular type may be a particular product out of the products of a particular company (e.g., a product regarding which the company is rolling out an advertising campaign). Further, the predetermined company may be a company which is a related company to the mobile network operator, or a company which has some sort of tie-up with the mobile network operator (affiliated company).

Thus, users using a wireless terminal device of a particular type can be given preferential treatment by giving discounts relating to transfer of USIM information usage rights, in accordance with which the transfer source and transfer destination wireless terminal devices are wireless terminal devices of a particular type (e.g., manufactured by Company S). For example, let us consider a case where we way that the wireless terminal device of a particular type is a wireless terminal device manufactured by Company S. In this case, the user can be expected to become endeared to Company S, and accordingly tend to use products by Company S more frequently. Also, the user can be given even more preferential treatment in accordance with the increase in usage. Also, giving the user such preferential treatment can be expected to serve as motivation to purchase new produces from Company S, and also use Company S products more frequently. Accordingly, the user is given preferential treatment, and also Company S can secure more stable profits due to such users who have become endeared continuing to purchase and use the products.

Example of Billing Fees According to Monetary Amount Used or Service Used

Next, an example of changing the fee relating to transfer of the USIM information usage right according to whether or not the monetary amount used or service used at the transfer source or transfer destination wireless terminal device satisfies certain conditions (subtraction conditions).

FIG. 21 is a simplified diagram illustrating an example of additional fees for billing processing by the billing processing unit 600 according to the second embodiment of the present disclosure. In the example shown in FIG. 21, predetermined services are, for example, electronic book download services, music contents and movie contents download services, and so forth. We will also say that X5 and X6 are positive values (i.e., $0<X5, 0<X6$), and that X5 and X6 are equal to or smaller than X4 (shown in FIG. 22) which is a fee relating to the transfer of the USIM information usage right in the event that the subtraction conditions are not met. We will further say that Y1 and Y2 are positive values (i.e., $0<Y1, 0<Y2$). Note that the example shown in FIG. 21 will be described with reference to FIG. 22.

Example of Operations of Billing Processing Unit

Figure 22:
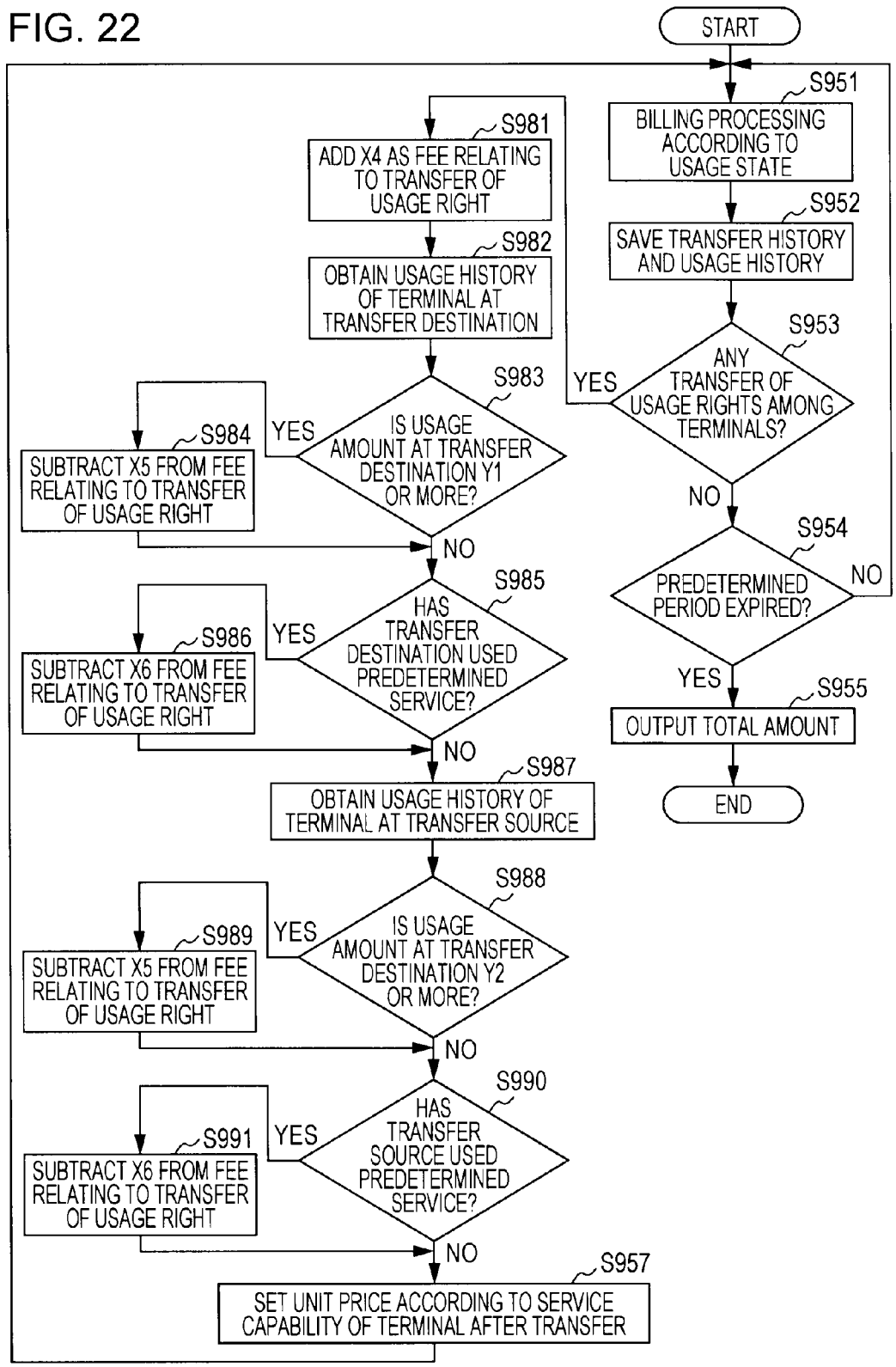
FIG. 22 is a flowchart illustrating an example of processing procedures for billing processing by the billing processing unit according to the second embodiment.

FIG. 22 is a flowchart illustrating an example of processing procedures for billing processing by the billing processing unit 600 according to the second embodiment of the present disclosure. Note that the flowchart shown in FIG. 22 is a modification of that in FIG. 14, so portions which are the same as with FIG. 14 will be denoted with the same step Nos. and description thereof will be omitted as appropriate.

In the event that the USIM information usage right has been transferred (Yes in step S953), the calculating unit 640 calculates the fee X4 relating to transfer of the USIM information usage right (step S981), and obtains history information of the transfer source wireless terminal device from the history information storage unit 620 (step S982).

Next, the calculating unit 640 determines whether or not the accumulated fees (monetary amount used) included in the history information are Y1 or greater (step S983). In the event that the accumulated fees are Y1 or greater (Yes in step S983), the calculating unit 640 subtracts X5 from the fee X4 relating to the transfer of the USIM information usage right (step S984), and the flow advances to step S985. On the other hand, in the event that the accumulated fees are less than Y1 (No in step S983), the flow advances to step S985.

Next, the calculating unit 640 determines whether or not a predetermined service is included in a service that has been used, included in the obtained history information (step S985). That is to say, determination is made regarding whether or not the transfer destination wireless terminal device has used the predetermined service. In the event that the transfer destination wireless terminal device has used the predetermined service (Yes in step S985), the calculating unit 640 subtracts X6 from the fee X4 relating to the transfer of the USIM information usage right (step S986), and the flow advances to step S987. On the other hand, in the event that the transfer destination wireless terminal device has not used the predetermined service (No in step S985), the flow advances to step S987.

Next, the calculating unit 640 obtains history information of the transfer source wireless terminal device from the history information storage unit 620 (step S987).

Next, the calculating unit 640 determines whether or not the accumulated fees (monetary amount used) included in the history information are Y2 or greater (step S988). In the event that the accumulated fees are Y2 or greater (Yes in step S988), the calculating unit 640 subtracts X5 from the fee X4 relating to the transfer of the USIM information usage right (step S989), and the flow advances to step S990. On the other hand, in the event that the accumulated fees are less than Y2 (No in step S988), the flow advances to step S990.

Next, the calculating unit 640 determines whether or not a predetermined service is included in a service that has been used, included in the obtained history information (step S990). That is to say, determination is made regarding whether or not the transfer source wireless terminal device has used the predetermined service. In the event that the transfer source wireless terminal device has used the predetermined service (Yes in step S990), the calculating unit 640 subtracts X6 from the fee X4 relating to the transfer of the USIM information usage right (step S991), and the flow advances to step S957. On the other hand, in the event that the transfer source wireless terminal device has not used the predetermined service (No in step S990), the flow advances to step S957. Note that, in the event that X5 and X6 are subtracted from the fee X4 and the fee relating to the transfer of the USIM information usage right becomes a negative value, the fee may be set to X4=0.

Now, while an example has been illustrated here where the fees X5 or X6 are subtracted in the event that either the transfer source or transfer destination satisfy the subtraction conditions, but these may be made to be different values. For example, values different from the fees X5 and X6 (e.g., X7 and X8) may be used for subtraction regarding the transfer source. Also, Y1, Y10, and Y11 (where Y1<Y10<Y11, for example) may be used as determination references for the accumulated fees (amount used) at the transfer destination, for example.

Also, while an example has been illustrated here where the monetary amount used (accumulated fees) or services used by the transfer source or transfer destination wireless terminal device are used for determination reference, other information may be used for determination reference. For example, in the event that the total monetary amount of items purchased by wireless communication using the shared USIM information (e.g., downloaded contents) can be obtained, the total monetary amount may be used for determination.

Thus, the calculating unit 640 can calculate fees relating to USIM information, using information indicating whether or not there is usage history of a particular service in at least one of the transfer source and transfer destination wireless terminal devices regarding which the USIM information usage right has been transferred. Also, the calculating unit 640 can calculate fees relating to USIM information, using information indicating the amount of usage of a service used by at least one of the transfer source and transfer destination wireless terminal devices regarding which the USIM information usage right has been transferred.

Accordingly, in the event that at least one of the transfer source and transfer destination wireless terminal devices regarding which the USIM information usage right has been transferred has used a particular service, fees relating to the transfer of the usage right can be discounted. Also, in the even that the monthly monetary amount used by at least one of the transfer source and transfer destination wireless terminal devices regarding which the USIM information usage right has been transferred has exceeded a predetermined monetary amount, fees relating to the transfer of the usage right can be discounted. Accordingly, the user can be expected to become endeared to the mobile network operator, and accordingly tend to use the mobile network operator more frequently. In this case, the user can be given even more preferential treatment. That is to say, the user is given preferential treatment, and also the mobile network operator can secure more stable profits due to continuing use by users who have become endeared.

Thus, according to the second embodiment of the present disclosure, users can be given preferential treatment by alleviating fees for USIM information (subscription authentication information) based on the types of multiple wireless terminal devices sharing the USIM information (subscription authentication information), usage state of wireless lines, and so forth. Accordingly, user satisfaction can be improved, and also fees relating to the USIM information (subscription authentication information) shared among the multiple wireless terminal devices can be appropriately calculated.

3. Modifications

With the first and second embodiments of the present disclosure, an example of transferring USIM information usage rights among multiple wireless terminal devices which the user is in an operable state has been illustrated. However, as with the case shown in FIG. 1B, cases are conceivable where the user is not able to operate wireless terminal devices (second wireless terminal device 400 and third wireless terminal device 700). Accordingly, in a modification of embodiments of the present disclosure, an example of transferring a USIM information usage right in a case where the user is not able to operate a wireless terminal device holding valid USIM information will be illustrated. Note that the configuration of the communication system according to this modification is generally the same as the example shown in FIGS. 1A and 1B and other drawings. Accordingly, portions thereof which are common with the first embodiment of the present disclosure will be denoted with the same reference numerals, and description thereof will be omitted as appropriate.

Example of Communication Among the Devices

Figure 23:
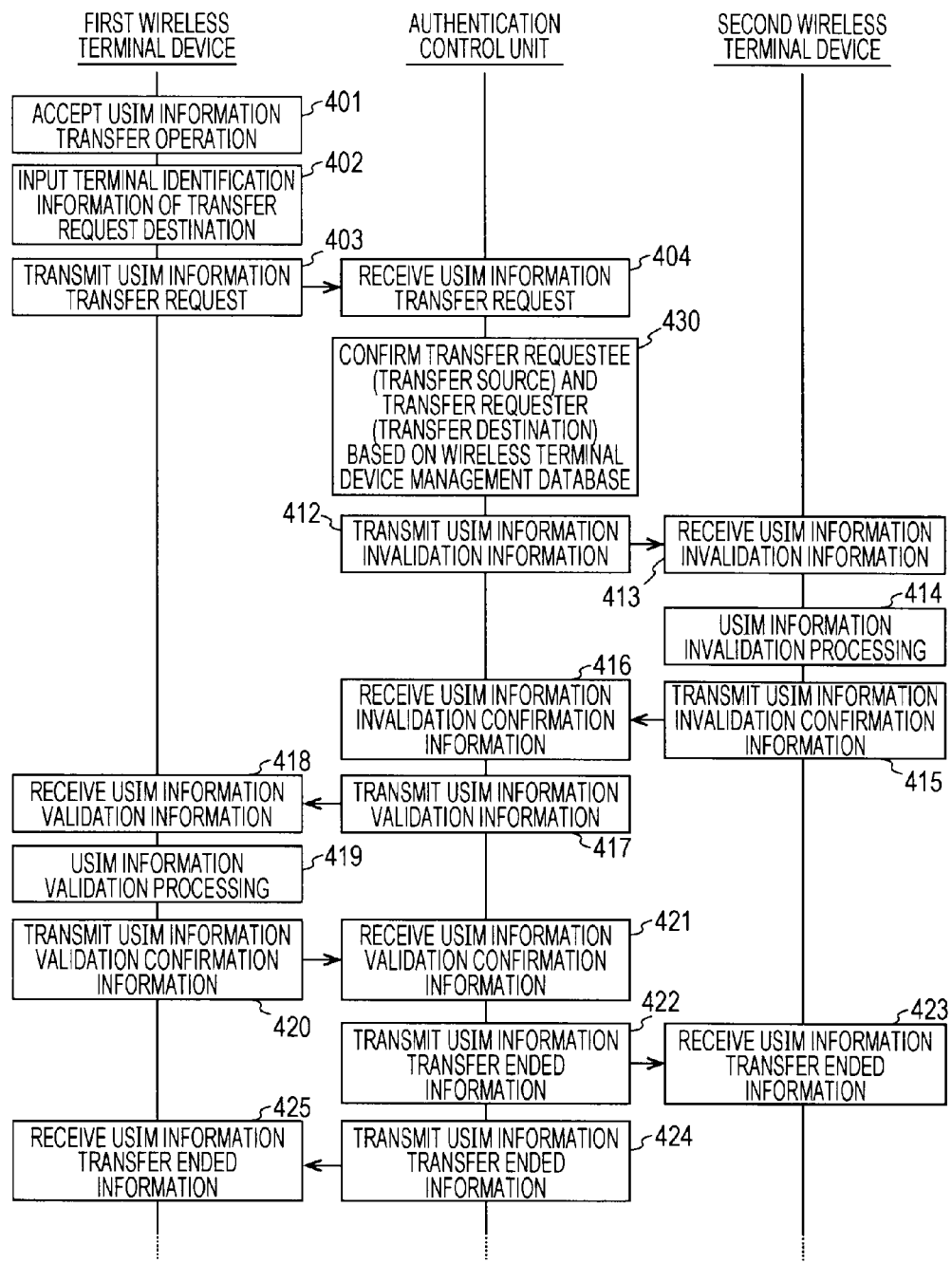
FIG. 23 is a sequence chart illustrating an example of communication processing performed among the devices making up the communication system according to a modification of the disclosure.

FIG. 23 is a sequence chart illustrating an example of communication processing among devices configuring the communication system 100 according to a modification of the present disclosure. Note that the sequence chart shown in FIG. 23 is a modification of that in FIG. 8, so portions which are the same as with FIG. 8 will be denoted with the same reference numerals, and description thereof will be omitted as appropriate.

Upon receiving the USIM information transfer request (404), the authentication control unit 210 confirms the transfer requestee (transfer source) and transfer requester (transfer destination) wireless terminal devices based on the contents of the wireless terminal device management database 220 (430) That is to say, the authentication control unit 210 confirms the transfer requestee (transfer source) and transfer requester (transfer destination) wireless terminal devices identified by the terminal identification included in the received USIM information transfer request.

Next, after this confirmation, the authentication control unit 210 transmits USIM information invalidation information for invalidating the USIM information of the transfer requestee (transfer source) to the transfer requestee (transfer source, i.e., second wireless terminal device 400) (412, 413).

Note that with this example, in the event that the USIM information invalidation confirmation information from the second wireless terminal device 400 has been received (416), the authentication control unit 210 transmits USIM information validation information to the first wireless terminal device 300 (417). However, there may be cases wherein the transfer requestee (transfer source) wireless terminal device has the power turned off or is out of service. Accordingly, an arrangement may be made wherein, even in the event that the USIM information invalidation confirmation information is not received from the transfer requestee (transfer source) wireless terminal device, USIM information validation information to the transfer requester (transfer destination) if certain conditions are met, for example. The certain conditions may be that, for example, the user of the transfer requestee (transfer source) has made settings to this effect beforehand, and also that no USIM information invalidation confirmation information is received from the transfer requestee (transfer source) even if a predetermined amount of time has elapsed.

However, if the USIM information validation information is transmitted to the transfer requester (transfer destination) when the USIM information invalidation confirmation information is not received from the transfer requestee (transfer source), the USIM information becomes valid at both the transfer requester (transfer destination) and the transfer requestee (transfer source). In this case, upon the power of the transfer requestee (transfer source) wireless terminal device being turned on or coming into range of service, access from the transfer requestee (transfer source) wireless terminal device to a base station will be permitted. Accordingly, in the event that USIM information invalidation confirmation information is not received from the transfer requestee (transfer source) and certain conditions are satisfied, the authentication control unit 210 rewrites the contents of the wireless terminal device management database 220. That is to say, the authentication control unit 210 rewrites the contents of the wireless terminal device management database 220 such that the transfer requester (transfer destination) is valid and the transfer requestee (transfer source) is invalid. Also, the authentication control unit 210 causes each base station to hold information (invalidation information) to the effect that the transfer requestee (transfer source) is invalid. The base stations are caused to hold this invalid information, and in the event that the transfer requestee (transfer source) wireless terminal device accesses a base station, the USIM information invalidation information is transmitted from that base station to the transfer requester (transfer source) wireless terminal device. Thus, the contents of the wireless terminal device management database 220 are rewritten, and the base stations are made to hold invalidation, following which the authentication control unit 210 transmits USIM information validation information to the transfer requester (transfer source).

For example, in the example shown in FIG. 23, in a case where USIM information invalidation configuration information is not received from the second wireless terminal device 400 and certain conditions are satisfied, the authentication control unit 210 rewrites the contents of the wireless terminal device management database 220. That is to say, the authentication control unit 210 rewrites the contents of the wireless terminal device management database 220 such that the first wireless terminal device 300 is valid and the second wireless terminal device 400 is invalid. Also, the authentication control unit 210 causes the base stations 231 through 233 to hold information (invalidation information) to the effect that the second wireless terminal device 400 is invalid. This invalidation information is held at the base stations 231 through 233, and in the event that the second wireless terminal device 400 accesses any one of the base stations 231 through 233, the USIM information invalidation information is transmitted from that base station to the second wireless terminal device 400. Thus, the contents of the wireless terminal device management database 220 are rewritten, invalidation is held at the base stations 231 through 233, following which the authentication control unit 210 transmits USIM information validation information to the first wireless terminal device 300.

As illustrated above, with this modification according to the present disclosure, in the event that USIM information (subscription authentication information) is shared among multiple wireless terminal devices, the user does not have to carry about the wireless terminal device holding the USIM information (subscription authentication information). For example, a user who has forgotten his/her wireless terminal device (e.g., a cellular telephone device) at home can borrow a wireless terminal device where he/she is and use this as his-her own wireless terminal device. Accordingly, USIM information (subscription authentication information) can be shared among multiple wireless terminal devices even more easily. Also, in this case as well, fees relating to the USIM information (subscription authentication information) shared between the multiple wireless terminal devices can be appropriately calculated.

Configuration Example of Wireless Terminal Device Management Database

With the first and second embodiments of the present disclosure, an example of transferring USIM information usage right among three wireless terminal devices has been illustrated. However, the first and second embodiments of the present disclosure can be applied to cases of transferring USIM information usage right among two, or four or more, wireless terminal devices. FIG. 24 illustrates an example of the contents of the wireless terminal device management database 220 in the case of transferring the USIM information usage right among four or more wireless terminal devices.

FIG. 24 is a diagram schematically illustrating the wireless terminal device management database 220 in a modification of embodiments of the present disclosure. Note that the wireless terminal device management database 220 shown in FIG. 24 differs from the arrangement shown in FIG. 4 with regard to the point of having four or more wireless terminal devices to be managed, but otherwise is generally the same.

For example, in the event that one user has M wireless terminal devices (where M≧4), the USIM information of just one wireless terminal device of M wireless terminal devices can be made valid, and the USIM information of the other wireless terminal devices invalid. In this case, "valid" is stored in one space of the valid/invalid information 224 in the wireless terminal device management database 220 shown in FIG. 24, and "invalid" is stored in the others.

Also, in the event that one user has M wireless terminal devices (where M≧3), the USIM information of N wireless terminal devices (where 1<N<M) of the M wireless terminal devices can be made valid, and the USIM information of the other wireless terminal devices invalid. In this case, "valid" is stored in N spaces of the valid/invalid information 224 in the wireless terminal device management database 220 shown in FIG. 24, and "invalid" is stored in the others.

Also, with the first and second embodiments of the present disclosure, an example of transferring a USIM information usage right among multiple wireless terminal devices which one user owns has been illustrated. However, the first and second embodiments of the present disclosure can be applied to a case wherein USIM information usage rights are transferred among multiple wireless terminal devices owned by multiple users, as well. For example, let us assume a group of five users, with each member of the group owning one wireless terminal device. In this case, for example, the USIM information of the wireless terminal devices of two users of the five group members can be made valid, and the USIM information of the wireless terminal devices of the remaining three users can be made invalid. In this case, the group can be registered in the wireless terminal device management database 220 shown in FIG. 24, and transfer processing can be made among the members registered in the group. In the event of performing transfer processing among members of a group in this way, as many subscriptions as the number of USIM information transferable among the members have to be made with the mobile network operator. Also, in this case, each time transfer of USIM information usage rights among the multiple wireless terminal devices is performed, the above-described billing processing is performed for the group. Also, fees relating to USIM information are calculated for the group, based on the billing information set in the wireless terminal devices to which the USIM information usage rights have been transferred.

Note that the embodiments of the present disclosure can be applied to portable or fixed wireless terminal devices other than cellular phones (e.g., terminal devices specifically for data communication), and fixed wireless terminal devices (wireless terminal devices designed to collect data from vending machines).

Also, with the embodiments, an example has been illustrated where the billing processing unit 600 is configured within a single device, but the various functions which the billing processing unit 600 has may be realized by multiple devices. In this case, the present disclosure is carried out by an information processing system made up of multiple devices realizing these functions.

Note that the embodiments of the present disclosure are illustrations of examples of carrying out the present disclosure, and there is correlation between the items in the embodiments of the disclosure and the features of the disclosure as laid forth in the Claims. Similarly, there is correlation between features of the disclosure as laid forth in the Claims and items in the embodiments of the disclosure called the same. It should be noted, however, that the present disclosure is not restricted to embodiments of the disclosure, and that the disclosure can be carried out by various modifications of the embodiments without departing from the essence of the disclosure.

Also, the processing procedures described with the embodiments of the disclosure may be considered to be a method having this series of procedures, and may be considered to be a program for causing a computer to execute the series of procedures and a recording medium storing the program. Examples of such a recording medium include CDs (Compact Disc), MDs (MiniDisc), DVDs (Digital Versatile Disk), memory cards, Blu-ray Discs (registered trademark), and so on.

The present disclosure contains subject matter related to that disclosed in Japanese Priority Patent Application JP 2010-284781 filed in the Japan Patent Office on Dec. 21, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a detecting unit configured to detect, with regard to a plurality of wireless terminal devices sharing a usage right of a subscriber identity module relating to a mobile network operator which provides wireless connection services, transfer of said usage right among the wireless terminal devices; and
a calculating unit configured to take a history relating to a usage of said subscriber identity module regarding the wireless terminal devices of which said usage right has been transferred, as a usage history of said subscriber identity module, in the event that a transfer of said usage right is detected, to calculate fees relating to said subscriber identity module occurring after said transfer, based on a transfer history of the usage right that has been detected, the usage history of said subscriber identity module, and billing information set for the wireless terminal device to which said usage right has been transferred, and to calculate fees relating to said subscriber identity module using, as the usage history of said subscriber identity module, at least one of
the contents of services which can be used by the wireless terminal devices regarding which said usage right has been transferred,
the communication time and communication amount used by each of said wireless terminal devices, and
capabilities relating to wireless communication which each wireless terminal device has.

2. The information processing device according to claim 1, wherein said calculating unit calculates fees relating to said subscriber identity module using, as the transfer history of the usage right that has been detected, the number of times that said usage right has been transferred.

3. The information processing device according to claim 1, wherein said calculating unit calculates fees relating to said subscriber identity module using, as the transfer history of the usage right that has been detected, an upper limit value and lower limit value identified by the number of times that said usage right has been transferred.

4. The information processing device according to claim 1, wherein said calculating unit calculates fees relating to said subscriber identity module using, as the transfer history of the usage right that has been detected, the types of the wireless terminal devices regarding which said usage right has been transferred.

5. The information processing device according to claim 1, wherein said calculating unit calculates fees relating to said subscriber identity module using, as the transfer history of the usage right that has been detected, information indicating whether or not at least one of a transfer source wireless terminal device and a transfer destination wireless terminal device, regarding which said usage right has been transferred, is a wireless terminal device of a specific type.

6. The information processing device according to claim 1, wherein said calculating unit calculates fees relating to said subscriber identity module using, as the transfer history of the usage right that has been detected, the contents of services used by the wireless terminal devices regarding which said usage right has been transferred.

7. The information processing device according to claim 1, wherein said calculating unit calculates fees relating to said subscriber identity module using, as the transfer history of the usage right that has been detected, information indicating whether or not there is usage history of a specific service by at least one of a transfer source wireless terminal device and a transfer destination wireless terminal device, regarding which said usage right has been transferred.

8. The information processing device according to claim 1, wherein said calculating unit calculates fees relating to said subscriber identity module using, as the transfer history of the usage right that has been detected, information indicating the amount of usage of a service used by at least one of a transfer source wireless terminal device and a transfer destination wireless terminal device, regarding which said usage right has been transferred.

9. The information processing device according to claim 1, wherein said detecting unit detects the transfer of said usage right in the event that the usage right of said subscriber identity module has been transferred among said wireless terminal devices via a wireless connection.

10. An information processing device comprising:
   a detecting unit configured to detect, with regard to a plurality of wireless terminal devices sharing a usage right of a subscriber identity module relating to a mobile network operator which provides wireless connection services, a transfer of said usage right among the wireless terminal devices; and
   a calculating unit configured to take a history relating to a usage of said subscriber identity module regarding the wireless terminal devices of which said usage right has been transferred, as a usage history of said subscriber identity module, to calculate fees relating to said subscriber identity module based on a transfer history of the usage right which has been detected, the usage history of said subscriber identity module, and billing information set for the wireless terminal device to which said usage right has been transferred, and to calculate fees relating to said subscriber identity module using, as the usage history of said subscriber identity module, at least one of
   the contents of services which can be used by the wireless terminal devices regarding which said usage right has been transferred,
   the communication time and communication amount used by each of said wireless terminal devices, and
   capabilities relating to wireless communication which each wireless terminal device has.

11. A communication system comprising:
   a plurality of wireless terminal devices which share a usage right of a subscriber identity module relating to a mobile network operator which provides wireless connection services, by transferring said usage right among said wireless terminal devices via a wireless connection; and
   an information processing device including
      a detecting unit configured to detect, with regard to said plurality of wireless terminal devices, a transfer of said usage right among the wireless terminal devices, and
      a calculating unit configured to take a history relating to a usage of said subscriber identity module regarding the wireless terminal devices of which said usage right has been transferred, as a usage history of said subscriber identity module, in the event that the transfer of said usage right is detected, calculate fees relating to said subscriber identity module occurring after said transfer, based on a transfer history of the usage right that has been detected, the usage history of said subscriber identity module, and billing information set for the wireless terminal device to which said usage right has been transferred, and to calculate fees relating to said subscriber identity module using, as the usage history of said subscriber identity module, at least one of
   the contents of services which can be used by the wireless terminal devices regarding which said usage right has been transferred,
   the communication time and communication amount used by each of said wireless terminal devices, and
   capabilities relating to wireless communication which each wireless terminal device has.

12. A billing method for a wireless terminal device, said method comprising:
   detecting, with regard to a plurality of wireless terminal devices sharing a usage right of a subscriber identity module relating to a mobile network operator which provides wireless connection services, transfer of said usage right among the wireless terminal devices;
   taking a history relating to a usage of said subscriber identity module regarding the wireless terminal devices of which said usage right has been transferred, as a usage history of said subscriber identity module;
   in the event that a transfer of said usage right is detected, calculating fees relating to said subscriber identity module occurring after said transfer, based on a transfer history of the usage right that has been detected, the usage history of said subscriber identity module, and billing information set for the wireless terminal device to which said usage right has been transferred; and
   calculating fees relating to said subscriber identity module using, as the usage history of said subscriber identity module, at least one of
   the contents of services which can be used by the wireless terminal devices regarding which said usage right has been transferred,
   the communication time and communication amount used by each of said wireless terminal devices, and
   capabilities relating to wireless communication which each wireless terminal device has.

13. The information processing device according to claim 1, wherein said calculating unit calculates fees relating to said subscriber identity module using, as the usage history of said subscriber identity module, the communication time and communication amount used by each of said wireless terminal devices, and capabilities relating to wireless communication which each wireless terminal device has.

* * * * *